United States Patent
Koch et al.

(10) Patent No.: US 7,011,166 B2
(45) Date of Patent: Mar. 14, 2006

(54) SYSTEM AND METHOD FOR ASSISTING WITH AUTOMATICALLY CONNECTING PIPE JOINTS WITH A HORIZONTAL BORING MACHINE

(75) Inventors: Geoff D. Koch, Perry, OK (US); Brad E. Mitchell, Perry, OK (US); David A. Rorabaugh, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 160 days.

(21) Appl. No.: 10/667,892

(22) Filed: Sep. 22, 2003

(65) Prior Publication Data

US 2004/0129455 A1 Jul. 8, 2004

Related U.S. Application Data

(63) Continuation-in-part of application No. 10/389,710, filed on Mar. 14, 2003, now abandoned, which is a continuation of application No. 10/074,445, filed on Feb. 11, 2002, now Pat. No. 6,550,547, which is a continuation of application No. 09/767,426, filed on Jan. 22, 2001, now abandoned, which is a continuation of application No. 09/146,123, filed on Sep. 2, 1998, now Pat. No. 6,179,065.

(51) Int. Cl.
   *E21B 19/14* (2006.01)

(52) U.S. Cl. .............. 175/24; 175/52; 175/85; 414/22.54; 414/22.65

(58) Field of Classification Search .......... 175/24, 175/52, 85, 61, 62, 203; 414/22.51, 22.53, 414/22.58, 22.63, 22.65, 22.68
   See application file for complete search history.

(56) References Cited

U.S. PATENT DOCUMENTS

| 2,338,625 | A | | 1/1944 | Curtis | 255/45 |
| 3,692,123 | A | | 9/1972 | Gyongyosi | 173/147 |
| 3,768,579 | A | * | 10/1973 | Klein | 173/164 |
| 4,042,123 | A | * | 8/1977 | Sheldon et al. | 414/22.71 |
| 4,453,603 | A | | 6/1984 | Voss et al. | 175/53 |
| 5,168,890 | A | | 12/1992 | Bongart et al. | 137/15 |
| 5,321,506 | A | | 6/1994 | Sargent | 348/95 |
| 5,355,965 | A | | 10/1994 | Rozendaal | 173/141 |
| 5,661,888 | A | | 9/1997 | Hanslik | 29/407.02 |
| 6,179,065 | B1 | | 1/2001 | Payne et al. | 175/24 |
| 6,550,547 | B1 | | 4/2003 | Payne et al. | 175/24 |
| 2002/0157870 | A1 | | 10/2002 | Bischel et al. | 175/52 |

FOREIGN PATENT DOCUMENTS

WO   WO 02/079603 A1   10/2002

* cited by examiner

Primary Examiner—William Neuder
(74) Attorney, Agent, or Firm—Tomlinson & O'Connell, P.C.

(57) ABSTRACT

An automatic pipe handling system for automatically transporting pipe sections to and from a horizontal boring machine. The system comprises a pipe handling assembly, a pipe lubrication assembly, a makeup/breakout assembly, and an automatic control system. The pipe handling assembly stores pipe sections and transports the pipe sections to and from the drill string of a boring machine. As the pipe handling assembly transports a pipe section, the pipe lubrication assembly lubricates the appropriate pipe joints. The makeup/breakout assembly secures the drill string and pipe joints so that pipe sections can be added to or removed from the drill string. A programmed controller automatically operates the pipe handling system and its components by synchronizing the operations of the pipe handling system. The controller sequences and times the operation of each aspect of the pipe handling system during both the boring operation and the backreaming operation.

17 Claims, 35 Drawing Sheets

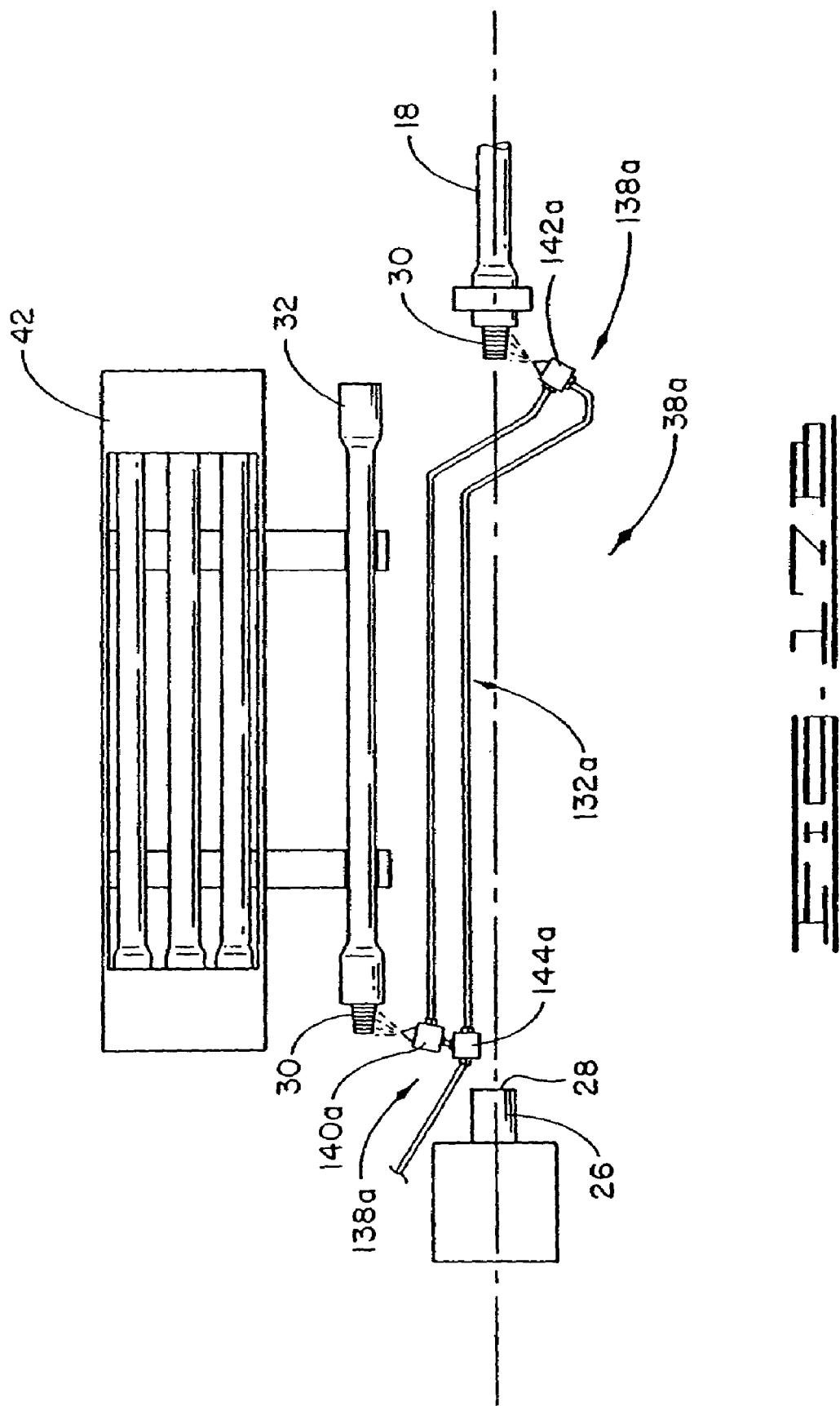

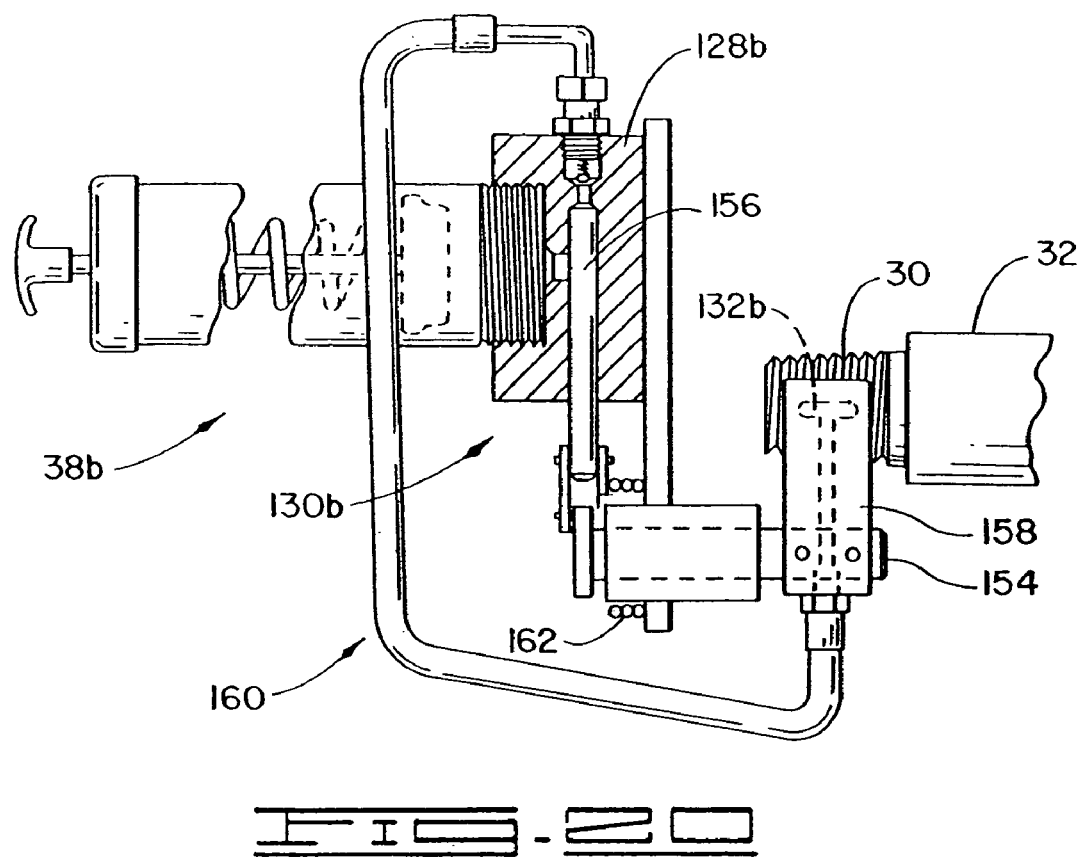
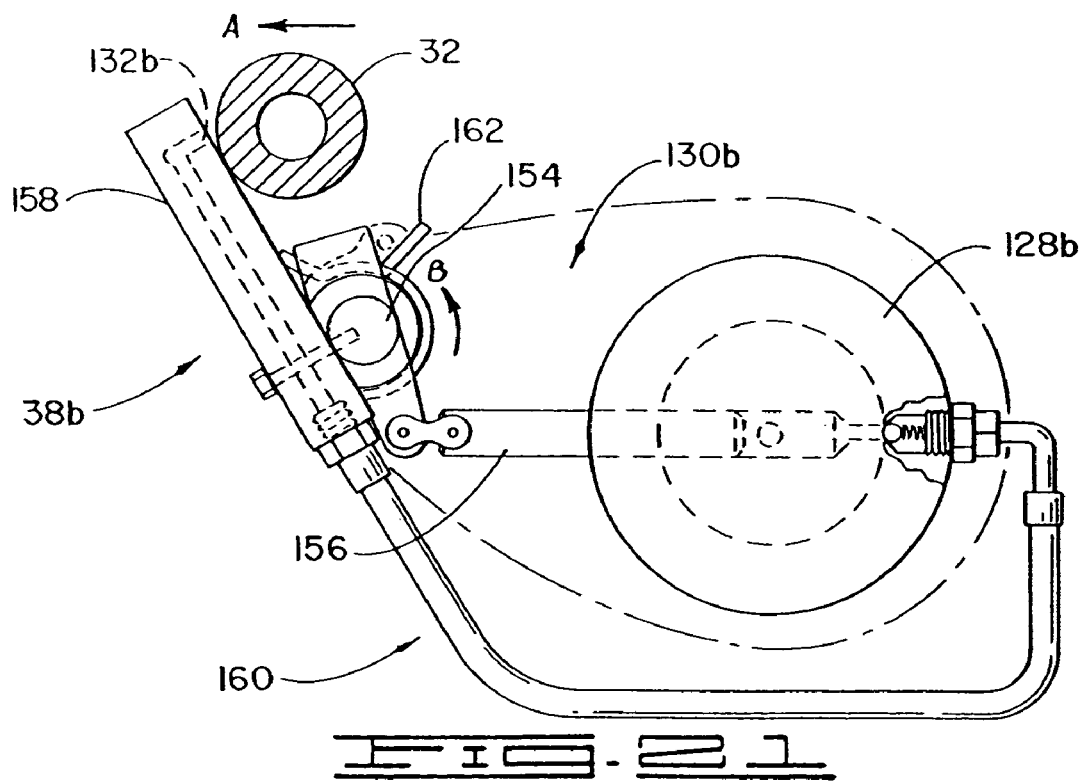

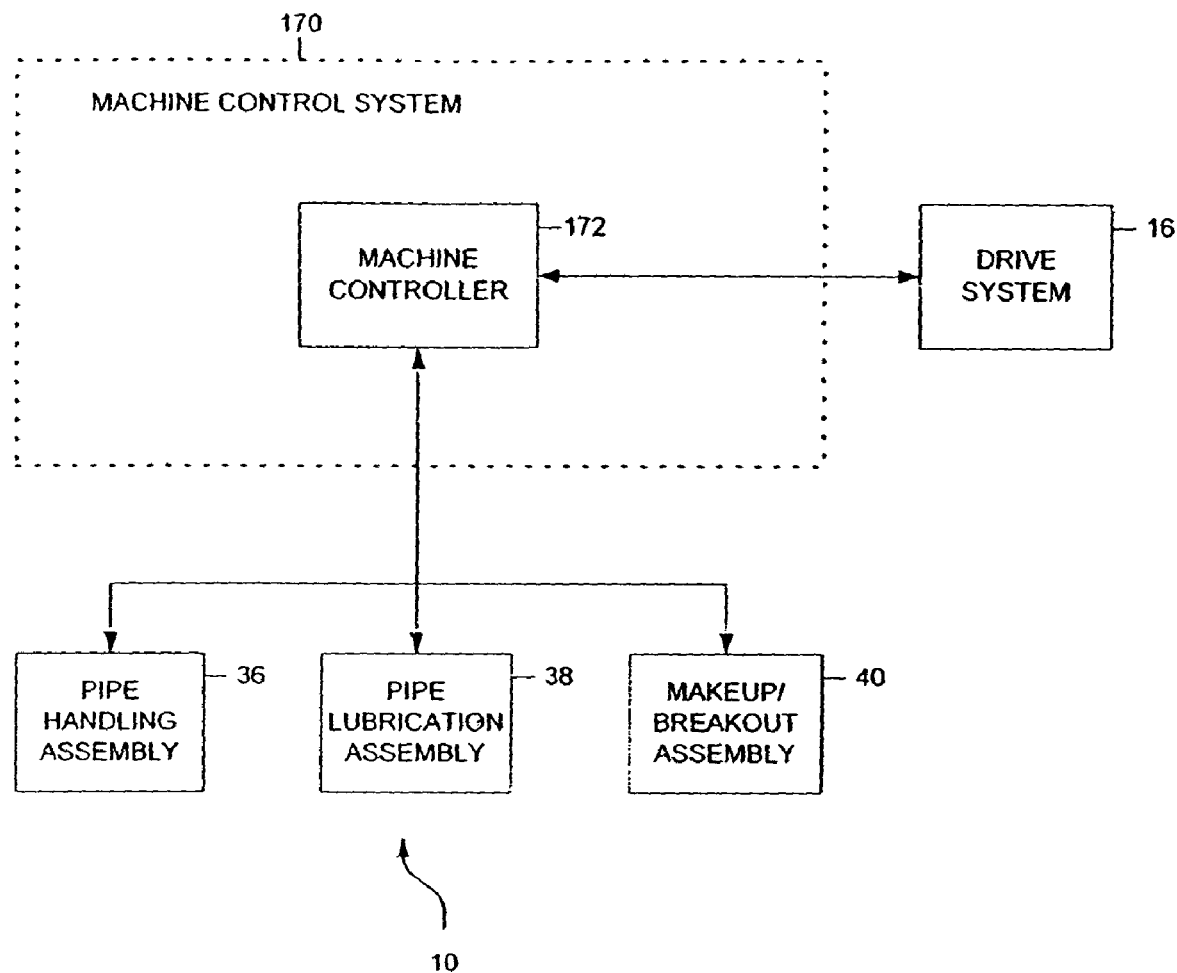

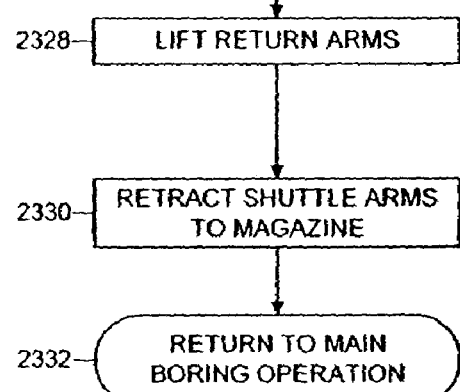
FIG. 24
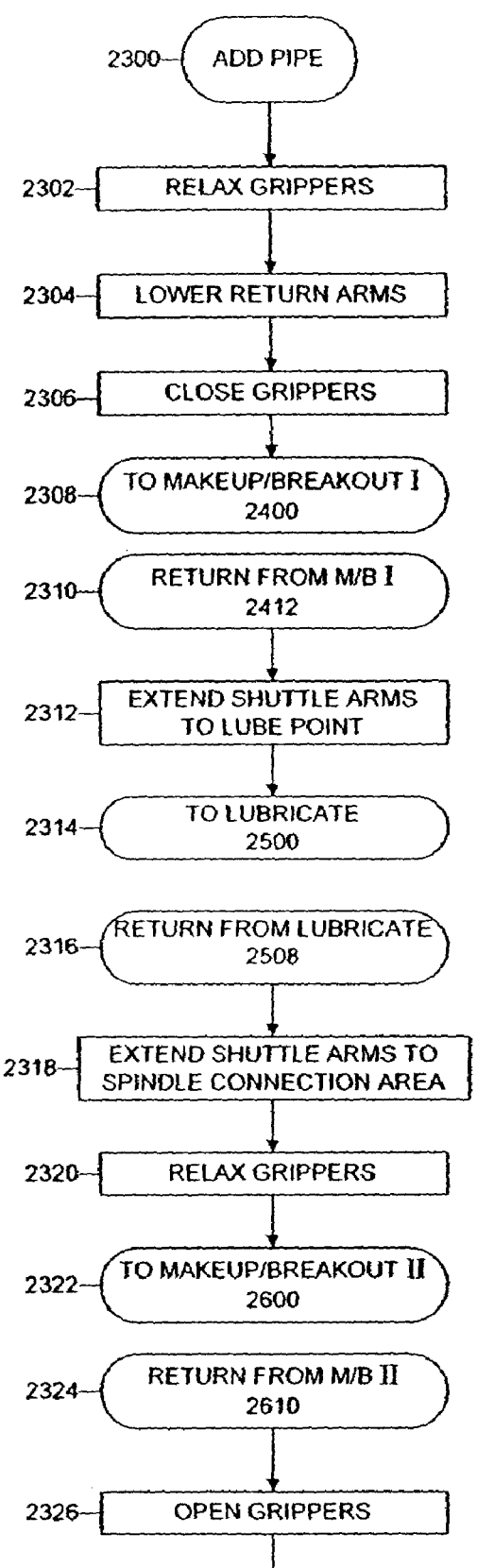

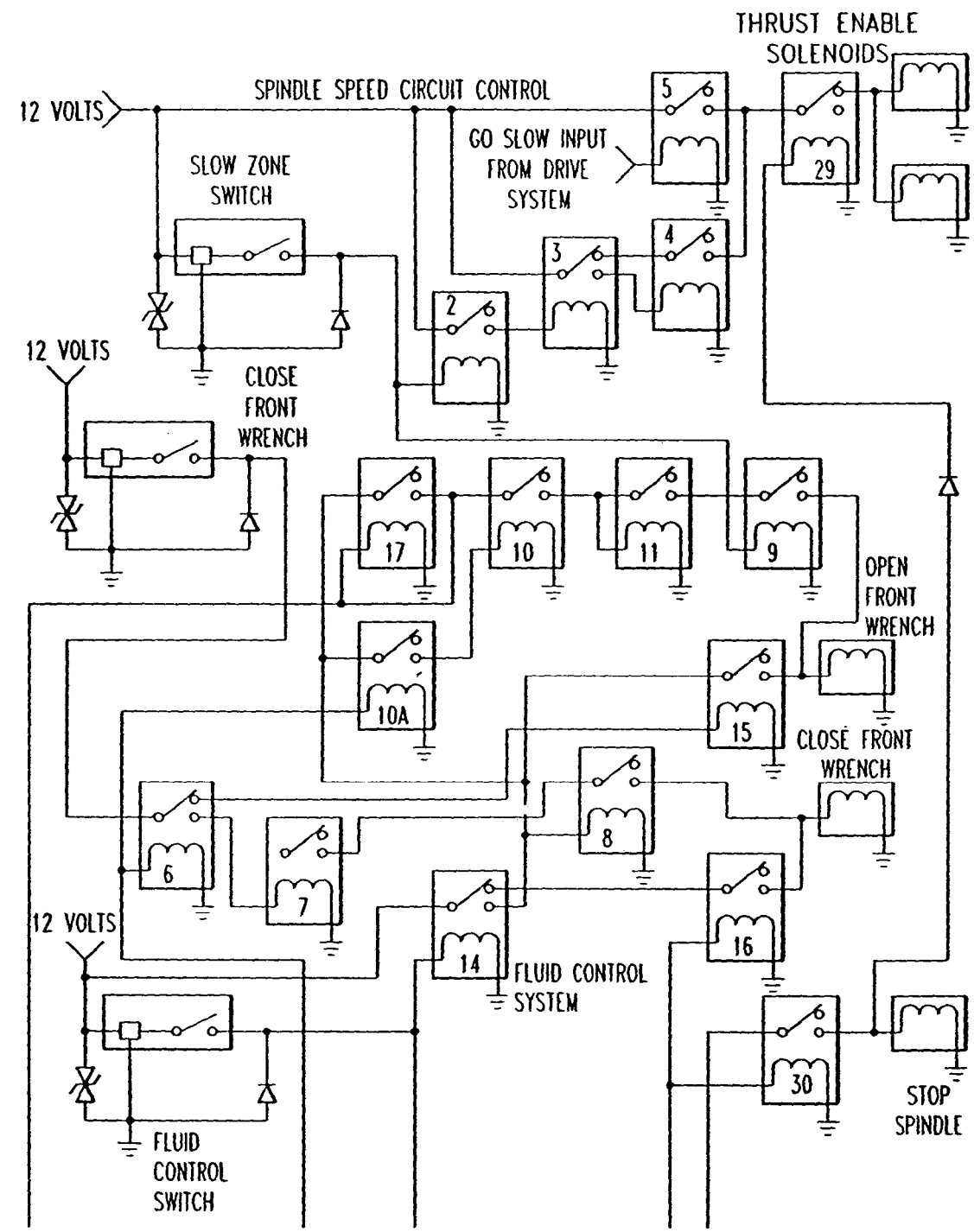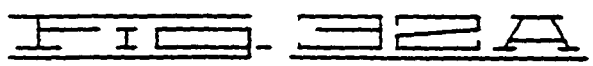

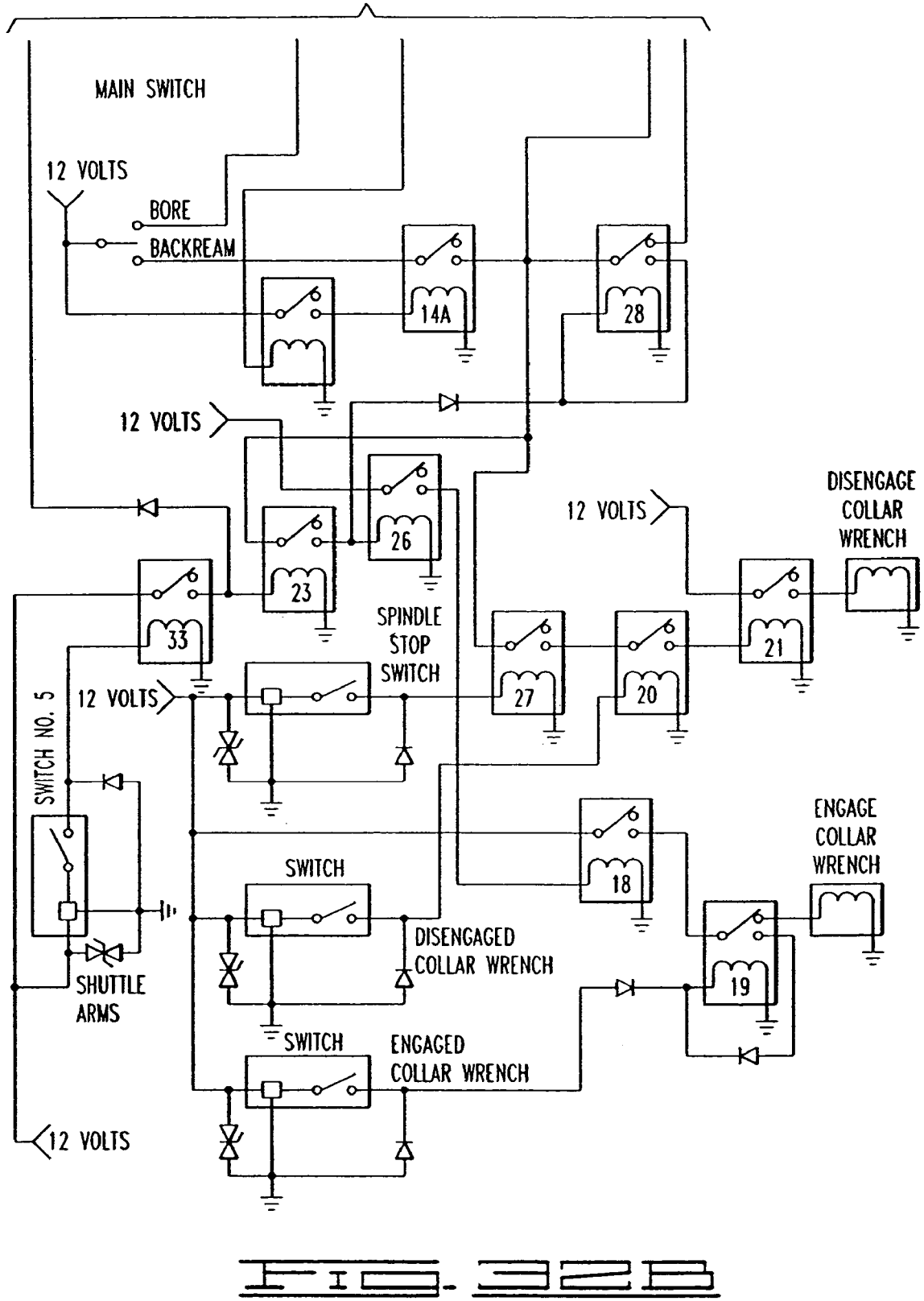

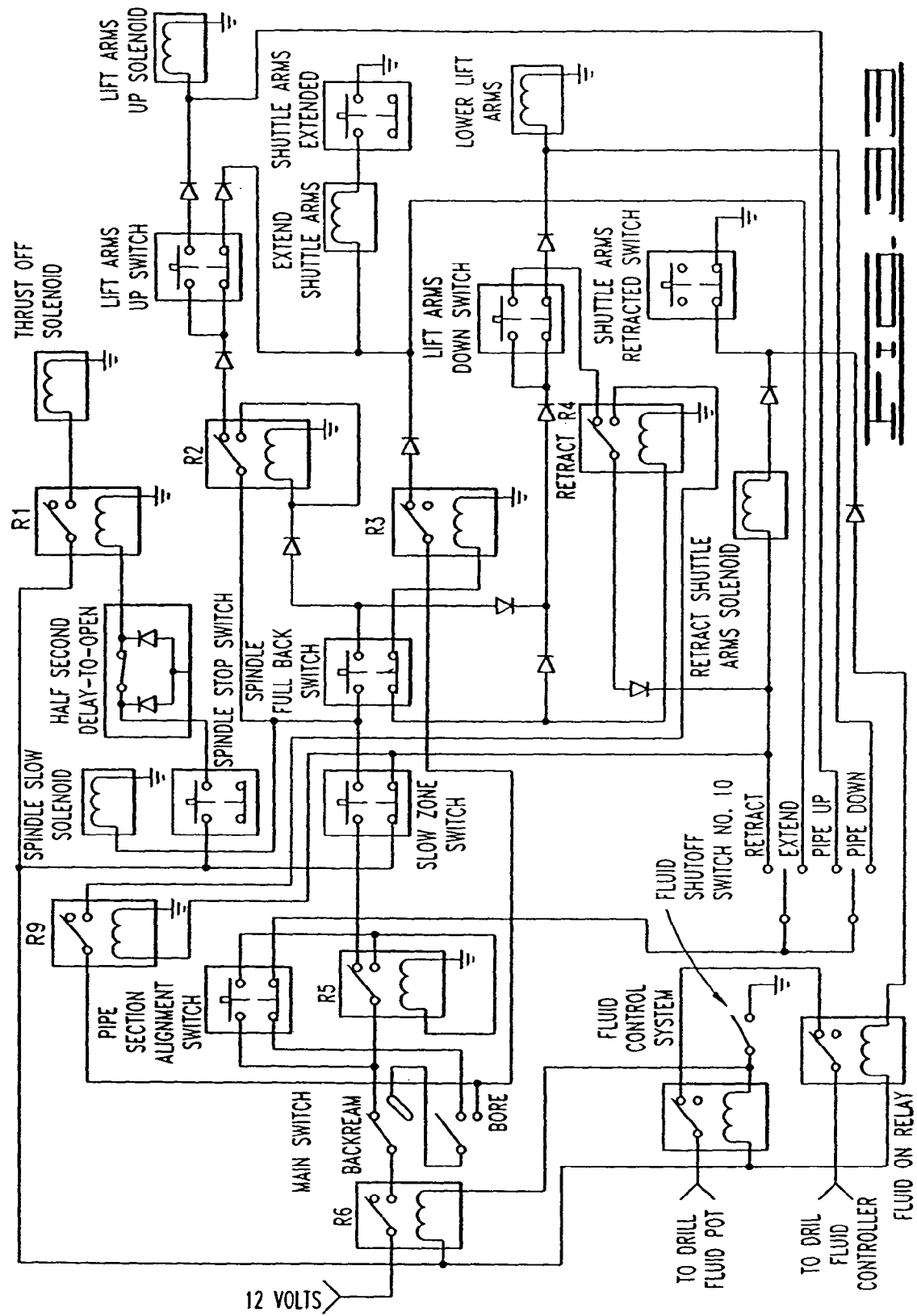

SYSTEM AND METHOD FOR ASSISTING WITH AUTOMATICALLY CONNECTING PIPE JOINTS WITH A HORIZONTAL BORING MACHINE

CROSS REFERENCE TO RELATED APPLICATION

This application is a continuation-in-part of U.S. application Ser. No. 10/389,710 filed Mar. 14, 2003, now abandoned which is a continuation of U.S. application Ser. No. 10/074,445 filed Feb. 11, 2002, now issued as U.S. Pat. No. 6,550,547, which is a continuation of U.S. application Ser. No. 09/767,426 filed Jan. 22, 2001, now abandoned, which is a continuation of U.S. application Ser. No. 09/146,123 filed Sep. 2, 1998, now issued as U.S. Pat. No. 6,179,065 on Jan. 30, 2001.

FIELD OF THE INVENTION

The present invention relates to the field of horizontal underground boring, and in particular to automated pipe handling systems for automatically loading and unloading pipes on a horizontal boring machine.

SUMMARY OF THE INVENTION

The present invention is directed to a pipe lubrication system for use with a horizontal boring machine. The horizontal boring machine comprises a spindle with a spindle pipe joint and a spindle connection area in which pipe sections are added to and removed from a drill string. Each pipe section of the drill string has a pipe joint at each end of the pipe section. The pipe lubrication system comprises a pipe lubrication assembly, a trigger mechanism, and a pipe lubrication control system. The trigger mechanism is adapted to indicate when lubricant is to be applied by the pipe lubrication assembly. Whereas, the pipe lubrication control system is adapted to operate the pipe lubrication assembly automatically in response to the trigger mechanism.

The present invention is further directed to a method of using a pipe lubrication assembly to lubricate a pipe joint when a pipe section is added to or removed from a drill string. The method comprises activating a trigger mechanism to indicate when to operate the pipe lubrication assembly. Furthermore, the method comprises automatically operating the pipe lubrication assembly by a pipe lubrication control system in response to activation of the trigger mechanism.

In another aspect, the invention is directed to a pipe handling system for use with a horizontal boring machine comprising a spindle, and a drive system. The drive system is adapted to drive a drill string composed of a plurality of pipe sections connectable at pipe joints. The spindle has a spindle pipe joint adapted to connect the drill string to the drive system in a spindle connection area. The pipe handling system comprises a pipe handling assembly and a handling assembly control system. The pipe handling assembly is adapted to store and transport the plurality of pipe sections toward and away from the spindle connection area. Whereas the handling assembly control system is adapted to maintain a pipe count of the number of pipe sections and automatically operate the pipe handling assembly.

Further, the present invention is directed to an automated pipe handling system for use with a horizontal directional drilling system having a drive system and a drill string comprised of a plurality of pipe sections connectable at pipe joints. The automated pipe handling system comprises a magazine and a handling assembly control system. The magazine has a plurality of columns for storing the pipe sections. The handling assembly control system is adapted to indicate the appropriate magazine column to or from which a pipe section is to be added or removed.

In yet another aspect, the invention is directed to a control system for a pipe handling system. The pipe handling system has a pipe lubrication assembly, a makeup/breakout assembly and a pipe handling assembly. The pipe handling assembly is adapted to store and transport at least one of a plurality of pipe sections. The pipe sections are transported toward and away from a spindle connection area of a spindle when the spindle is in position to receive and release a pipe section. The control system comprises a handling assembly control system adapted to automatically operate the pipe handling assembly. The handling assembly control system in turn comprises a handling system sensor assembly and a handling assembly controller. The handling system sensor assembly is adapted to detect and to transmit a spindle position signal to indicate a spindle position along the spindle connection area. The handling assembly controller is adapted to receive the spindle position signal and operate the pipe handling assembly to transport the pipe section toward or away from the spindle connection area in response to the spindle position signal.

In still another aspect, the present invention is directed to an automated makeup/breakout system for use with a horizontal boring machine having a drive system, a drill string and a spindle. The drill string is formed by a plurality of pipe sections connectable at threaded pipe joints. The spindle has a spindle pipe joint for connecting the drill string to the drive system in a spindle connection area. The automated makeup/breakout system comprises a makeup/breakout assembly and a makeup/breakout control system. The makeup/breakout assembly is adapted to coordinate rotation and thrust of the spindle when a pipe connection is made or broken. This is done in a manner such that the rotation and thrust of the spindle is coordinated with a threaded pitch of the threaded pipe joint and the spindle pipe joint as each of the pipe sections is connected to, or disconnected from, the drill string and the spindle pipe joint. The makeup/breakout control system is adapted to automatically operate the makeup/breakout assembly.

The invention is further directed to an automated backreaming system for use with a horizontal boring machine having a drill string, a spindle and a spindle connection area. The drill string is formed of a plurality of pipe sections connectable at threaded pipe joints. The spindle connection area where a pipe section is disconnected from the drill string. The disconnected pipe section is automatically transported and stored away from the spindle connection area. The automated backreaming system comprises a breakout assembly and a breakout control system. The breakout assembly is adapted to disconnect a pipe section in the spindle connection area from the drill string. The breakout control system is operably connectable to the breakout assembly and is adapted to automatically operate the breakout assembly.

In yet another aspect, the present invention is directed to a pipe handling system for use with a horizontal boring machine during backreaming. The horizontal boring machine has a drill string, made up of a plurality of pipe sections connectable at threaded pipe joints, a spindle and a spindle connection area. The spindle connection area where a pipe section is disconnected from the drill string. The pipe handling system comprises a breakout assembly, a pipe handling assembly, a breakout control system, and a handling assembly control system. The breakout assembly is adapted to disconnect a pipe section in the spindle connection area from the drill string. The pipe handling assembly is adapted to automatically transport and store the disconnected pipe section away from the spindle connection area. The breakout control system is operably connectable to the breakout assembly and is adapted to automatically operate the breakout assembly. Finally, the handling assembly control system is operably connectable to the pipe handling assembly and is adapted to automatically operate the pipe handling assembly.

In still another aspect, the present invention is directed to a horizontal boring machine comprising a frame, a drill string, a drive system, a breakout assembly, a pipe handling assembly, a breakout control system, and a handling assembly control system. The drill string is made up of a plurality of pipe sections disconnectable at threaded pipe joints. The drive system is supportable on the frame and is operably connectable to the drill string in the spindle connection area. Additionally, the drive system is adapted to withdraw the drill string through a horizontal bore hole. The breakout assembly is adapted to disconnect a pipe section in the spindle connection area from the drill string. The pipe handling assembly is adapted to automatically transport and store the disconnected pipe section away from the spindle connection area. The breakout control system is connectable to the breakout assembly and is adapted to automatically operate the breakout assembly. Finally, the handling assembly control system is operably connectable to the pipe handling assembly and is adapted to automatically operate the pipe handling assembly.

In yet another aspect, the present invention is directed to a breakout control system for a breakout assembly for use with a horizontal boring machine during backreaming. The horizontal boring machine has a drill string, made up of a plurality of pipe sections disconnectable at threaded pipe joints, a spindle, and a spindle connection area where a pipe section is disconnected from the drill string.

The breakout control system comprises a connection sensor assembly and a connection controller. The connection sensor assembly is adapted to generate and transmit a spindle position signal and a spindle connection signal. The spindle position signal and the spindle connection signal indicate when the breakout assembly is to be operated. The connection controller is adapted to receive the spindle position signal and the spindle connection signal and operate the breakout assembly in response to the received signals.

The invention is further directed to an automated pipe handling system for use with a horizontal boring machine. The horizontal boring machine has a drive system, a drill string, a spindle, and a spindle connection area. The drill string is made up of a plurality of pipe sections connectable at threaded pipe joints. The spindle has a pipe joint, and the spindle connection area is where a pipe section in the spindle connection area is disconnected from an exposed uphole end of the drill string. The automated pipe handling system has a breakout assembly, a pipe handling assembly, and a pipe lubrication assembly. The breakout assembly is adapted to automatically disconnect a pipe section in the spindle connection area from the drill string. The pipe handling assembly is adapted to automatically transport and store the disconnected pipe section away from the spindle connection area. Finally, the pipe lubrication assembly is adapted to automatically apply lubricant to the exposed uphole end of the drill string or the spindle pipe joint prior to the spindle connecting to the drill string.

In yet another aspect, the present invention is directed to a method for backreaming a horizontal borehole. The method comprises automatically pulling a drill string composed of a plurality of pipe sections connected at threaded pipe joints back through the horizontal borehole. Additionally, the method provides for automatically disconnecting a pipe section from the drill string, and automatically transporting and storing the disconnected pipe section away from the drill string.

In yet another aspect, the present invention is directed to a method for backreaming a horizontal borehole. The method comprises automatically initiating and coordinating a plurality of operations to sequentially remove pipe sections from a drill string comprising a plurality of pipe sections. The pipe sections that are removed from the drill string are transported and stored away from the drill string.

BRIEF DESCRIPTION OF THE DRAWINGS

FIG. 16 is an exploded, schematic illustration of a preferred embodiment of a pipe lubrication assembly.

FIG. 17b is an exploded, partial top view of the pipe lubrication assembly of FIG. 17a.

FIG. 20 is an exploded, partially fragmented side elevational view of an alternative embodiment of the pipe lubrication assembly.

FIG. 21 is an exploded end elevational view of the pipe lubrication assembly of FIG. 20.

FIG. 22 is a schematic illustration of a machine control system in accordance with an embodiment of the present invention.

FIGS. 23–27 illustrate flow diagrams of software for the machine control system of FIG. 22 during a boring operation.

FIG. 32 is a schematic illustration of an alternative embodiment for a circuit for controlling a makeup/breakout assembly.

FIG. 33 is a schematic illustration of an alternative embodiment for a circuit for controlling a pipe handling assembly.

BACKGROUND OF THE INVENTION

Figure 1:
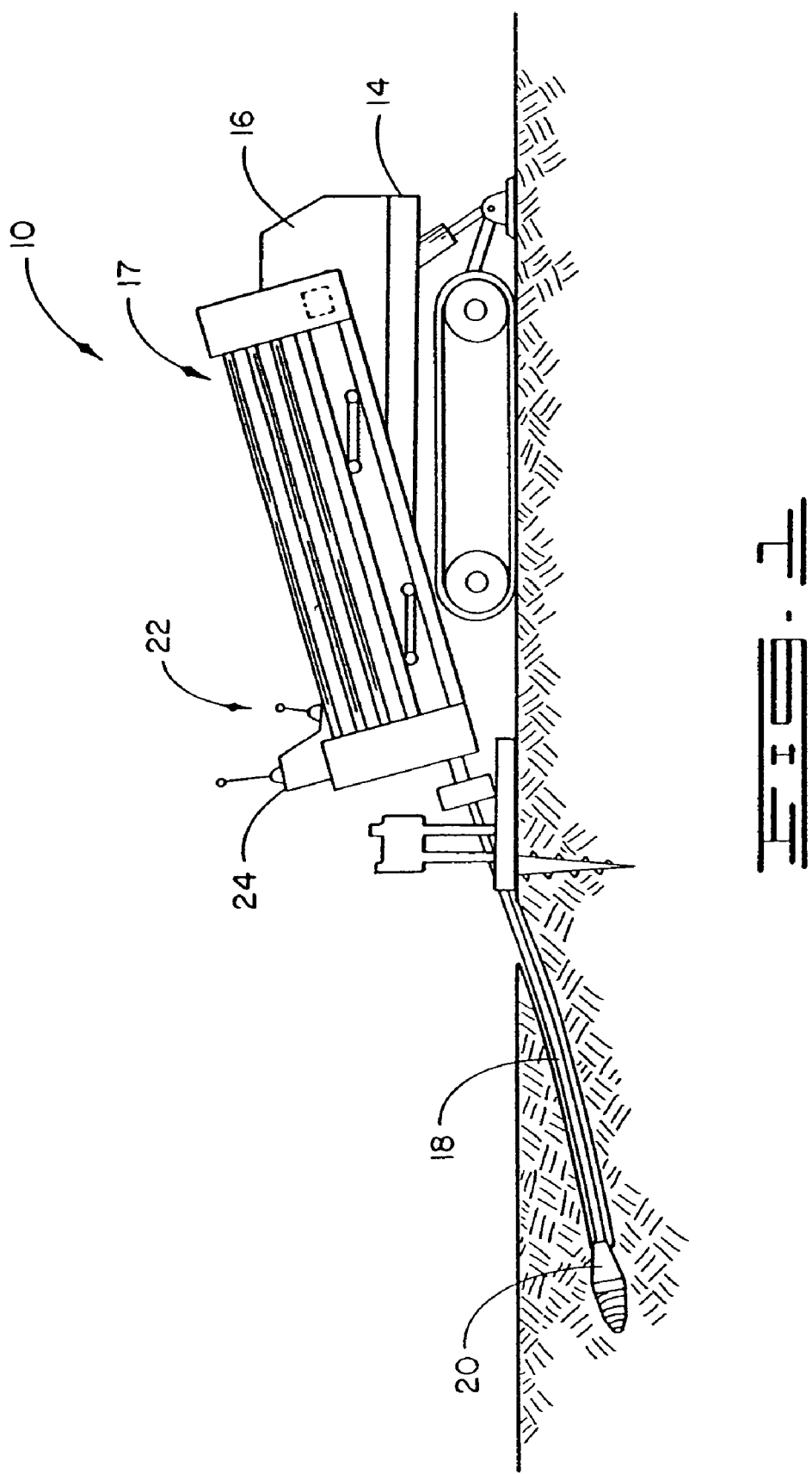
FIG. 1 is a side view of a horizontal boring machine with a pipe handling system in accordance with the present invention.

Horizontal boring machines are used to install utility services or other products underground. Horizontal boring eliminates surface disruption along the length of the project, except at the entry and exit points, and reduces the likelihood of damaging previously buried products. Skilled and experienced crews have greatly increased the efficiency and accuracy of boring operations. However, there is a continuing need for more automated boring machines which reduce the need for operator intervention and thereby increase the efficiency of boring underground.

The boring operation is a process of using a boring machine to advance a drill string through the earth along a desired path. The boring machine generally comprises a frame, a drive system mounted on the frame and connected to one end of the drill string, and a boring tool connected to the other end of the drill string. The drive system provides thrust and rotation needed to advance the drill string and the boring tool through the earth. The drive system generally has a motor to rotate the drill string and separate motor to push the drill string. The drill string is advanced in a straight line by simultaneously rotating and pushing the drill string through the earth. To control the direction of the borehole, a slant-faced drill bit may be used. When the direction of the borehole must be changed, the drill bit is positioned with the slant-face pointed in the desired direction. The drill string is then pushed through the earth without rotation, so that the slant-face causes the drill string to deflect in the desired direction.

The drill string is generally comprised of a plurality of drill pipe sections joined together at threaded connections. As the boring operation proceeds, the drill string is lengthened by repeatedly adding pipe sections to the drill string. Each time a pipe section is added to the drill string the pipe section being added is aligned with the drill string, the threaded joints are lubricated to ensure proper connections, and the connections between the drive system, the pipe section, and the drill string are secured. The process is the same each time a pipe section is added to the drill string.

When the boring operation is completed, the drill string is pulled back through the borehole, generally with the utility line or product to be installed underground connected to the end of the drill string. Many times, the original borehole must be enlarged to accommodate the product being installed. The enlarging of the borehole is accomplished by adding a backreaming tool between the end of the drill string and the product being pulled through the borehole. During this backreaming operation, pipe sections are removed from the drill string as the drill string gets shorter. Each time a pipe section is taken from the drill string, the connections between the drive system, the pipe section, and the drill string are broken, the pipe section is removed from the boring machine, and the threaded joint of the drill string is lubricated before the drive system is reconnected to the drill string so the backreaming operation can continue. As is the case with the addition of pipe sections to the drill string, the process is repetitive. As one skilled in the art will appreciate, efficient and economic machines for adding and removing pipe sections are a present need in the industry.

DETAILED DESCRIPTION OF THE PREFERRED EMBODIMENTS

Turning now to the drawings in general and FIG. 1 in particular, there is shown in FIG. 1 a horizontal boring machine in accordance with the present invention. The boring machine, designated by reference numeral 10, generally comprises a frame 14, a drive system 16 supported on the frame, a pipe handling system 17 supported on the frame, a drill string 18, and a directional boring tool 20. The boring machine 10 is operated and monitored with controls located at an operator's console 22. The operator's console 22 contains a control panel 24 having a display, joystick, and other machine function control mechanisms, such as switches and buttons. From the control panel 24, each of the underlying functions of the boring machine 10 can be controlled. The display on the control panel 24 may include a digital screen and a plurality of signaling devices, such as gauges, lights, and audible devices, to communicate the status of the operations to the operator.

Figure 2:
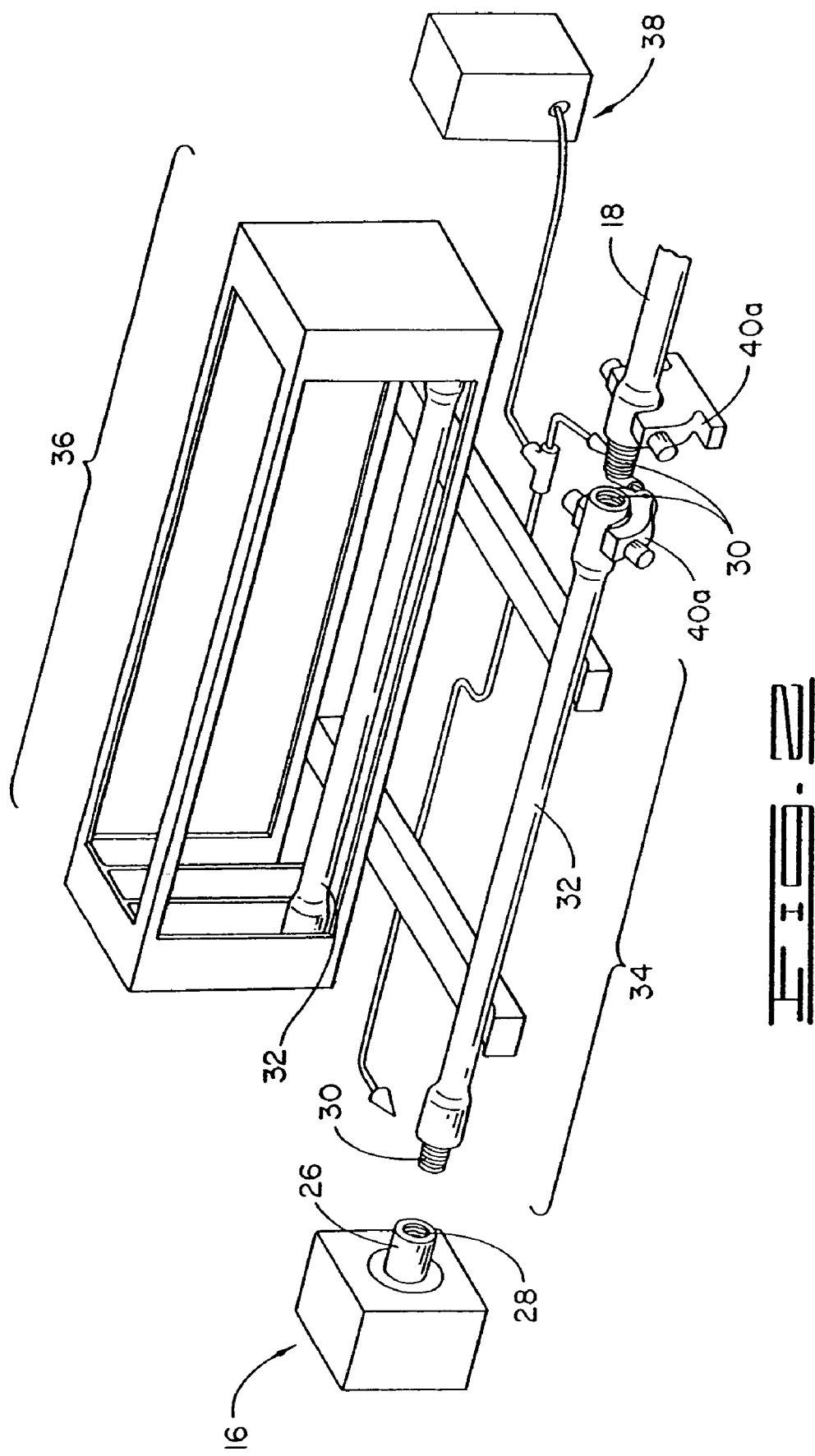
FIG. 2 is a right frontal perspective view of a pipe handling assembly, a makeup/breakout assembly, and a pipe lubrication assembly for use with a horizontal boring machine.

As depicted in FIG. 2, the drive system 16 is connected to the drill string 18 by way of a spindle 26. The spindle 26 comprises a threaded spindle pipe joint 28 for connection to a threaded pipe joint 30 on the end of a pipe section 32. As used herein, a pipe joint 30 can be either of the male or female threaded ends of a pipe section 32. One skilled in the art will appreciate that the drill string 18 is formed of a plurality of individual pipe sections 32 connected together at threaded pipe joints 30. As designated herein, the reference numeral 32 will refer to individual pipe sections 32 and the reference numeral 18 will refer to the drill string 18 in the earth, where it is understood that the drill string comprises at least one pipe section.

One skilled in the art will also appreciate that the connections between the spindle 26 and an individual pipe section 32, between the spindle and the end of the drill string 18, or between the pipe sections comprising the drill string, involve a careful coordination between the rotation and thrust of the spindle. Whenever a connection is made or broken, the rotation and the thrust of the spindle 26 must be coordinated to meet the threaded pitch of the pipe joints 30 and the spindle pipe joint 28 so that the threads of the joints are not damaged. Where connections between joints are discussed in this application, it will be understood that the thrust and rotation of the spindle 26 are being coordinated so as not to damage the joints.

As the boring machine 10 bores the borehole and the drill string 18 is lengthened, additional pipe sections 32 are added or "made up." The makeup operation begins with the spindle 26 at the back end 33 of a spindle connection area 34, remote from the exposed end of the drill string 18. A pipe section 32 is transported to the spindle connection area 34 by a pipe handling assembly 36. As the pipe section 32 is transported, and before the pipe section is connected to the drill string 18, the pipe lubrication assembly 38 lubricates pipe joints 30 to ensure proper connections are made. A makeup/breakout assembly 40 then secures the pipe section and the drill string 18 so that the spindle 26 can be connected to the pipe section and the pipe section can be connected to the drill string. The boring operation can then continue by advancing the drill string 18 along the desired path.

When the boring operation is complete, the backreaming operation is started to enlarge the borehole. At the same time, a utility line or other product to be installed underground can be attached to the end of the drill string 18 and pulled back through the borehole. During the backreaming operation, pipe sections 32 are removed from the drill string 18 or "broken out." When the spindle 26 has moved to the back end 33 of the spindle connection area 34, the pipe section 32 in the spindle connection area is removed from the drill string 18. The makeup/breakout assembly 40 secures the pipe section 32 and the drill string 18 in order to disconnect the spindle 26 from the pipe section 32 in the spindle connection area 34 and the pipe section from the drill string 18. The pipe section 32, free from the drill string 18 and the spindle 26, is then transported out of the spindle connection area 34 by the pipe handling assembly 36. The spindle 26 is then moved to the front end of the spindle connection area 34. The spindle pipe joint 28 or pipe joint 30 on the exposed end of the drill string is then lubricated so the spindle 26 can be reconnected to the drill string 18. The backreaming operation can then continue by pulling the drill string 18 back through the borehole.

Traditionally, the makeup and breakout operations have been performed by the operator, with the assistance of wrenches on the boring machine 10 and by manually applying lubricant when needed. One advantage of the present invention is that it provides an apparatus to automatically perform the underlying functions of the makeup and breakout operations.

Pipe Handling System

Figure 3:
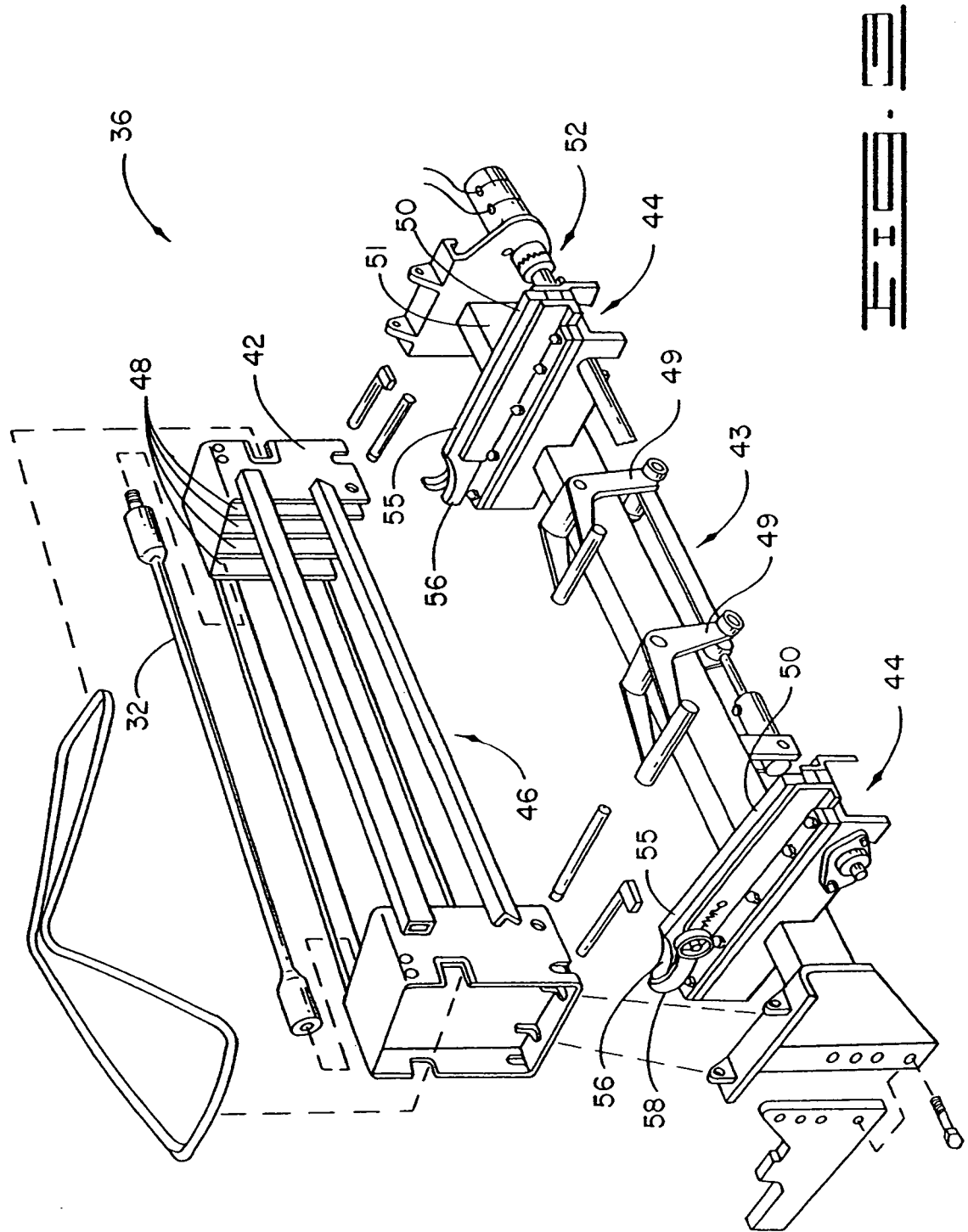
FIG. 3 is an exploded left frontal perspective view of the pipe handling assembly shown in FIG. 2.
Figure 4:
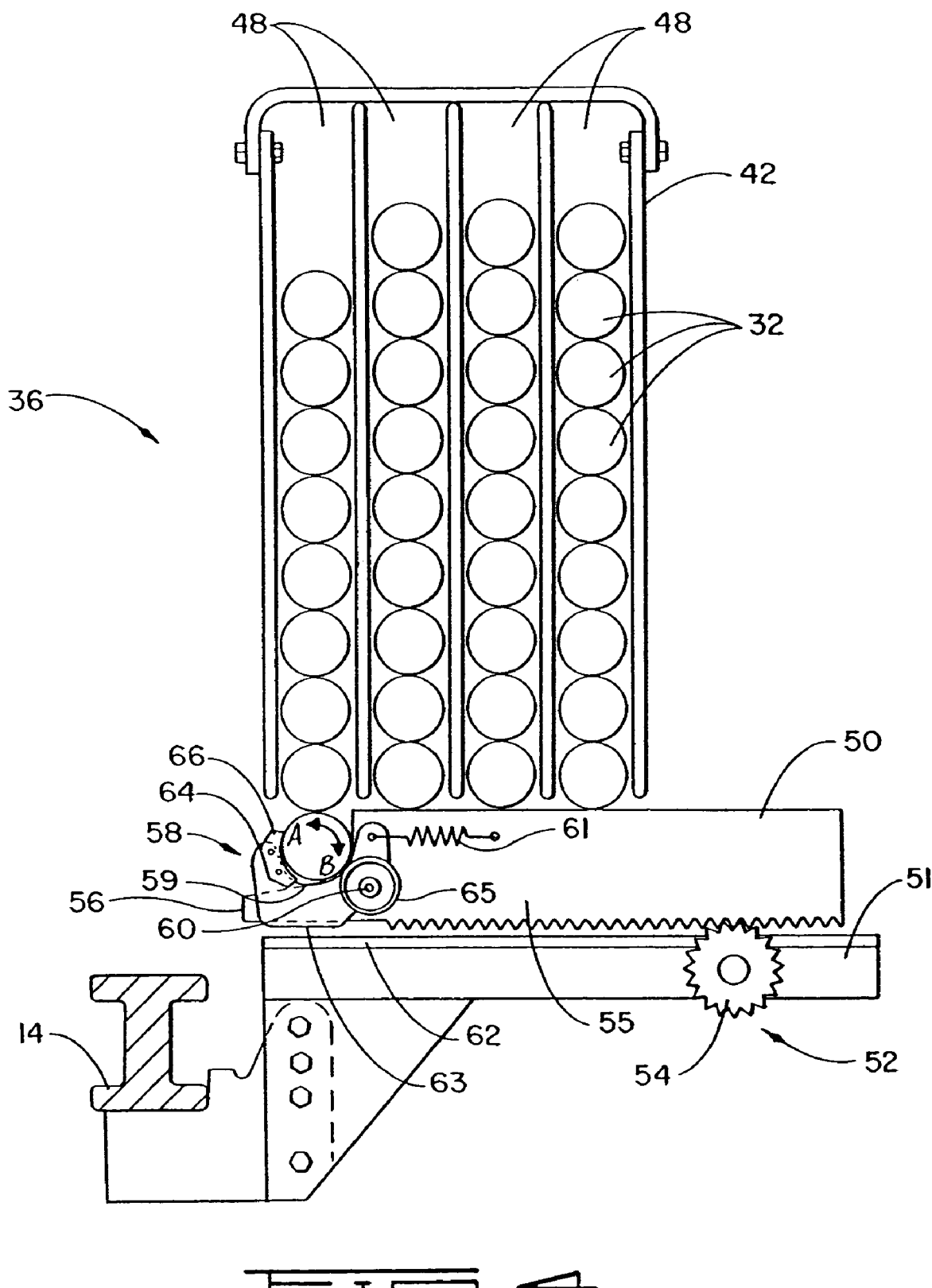
FIG. 4 is a partial sectional end elevational view of the pipe handling assembly of FIG. 3.

A preferred embodiment for the pipe handling assembly 36 of the present invention is shown in more detail in FIGS. 3 and 4. Pipe handling assemblies suitable for use with the present invention are described in U.S. patent application Ser. No. 08/624,240, filed by the Charles Machine Works, Inc. on Mar. 29, 1996, entitled Pipe Handling Device, the contents of which are incorporated herein by reference.

The pipe handling assembly 36 shown in FIGS. 3 and 4 shuttles pipe sections 32 between a storage position and the spindle connection area 34 (see FIG. 1). The pipe handling assembly 36 is preferably attached to the frame 14 of the boring machine 10 or positioned proximate the frame for storing and transporting pipe sections 32 to and from the drill string 18. The pipe handling assembly 36 comprises a magazine 42 for storing the pipe sections 32, a pipe return assembly 43 for lifting pipe sections in and out of the magazine, and a transport assembly 44 for transporting pipe sections between the magazine and the spindle connection area 34.

The magazine 42 defines an open bottom 46 and a plurality of pipe receiving columns 48. This configuration accommodates a plurality of pipe sections 32 which may be stacked in generally horizontal columns 48 and which may be dispensed or replaced through the open bottom 46 of the magazine 42. As described fully in U.S. patent application Ser. No. 08/624,240, the magazine 42 is also designed to be removed from the pipe handling assembly 36 so that another magazine with additional pipe sections 32 can be provided to the boring machine 10 during the boring operation. Similarly, an empty magazine 42 can be provided during the backreaming operation for storage of pipe sections 32 removed from the drill string 18.

The pipe return assembly 43 (FIG. 3) is positioned beneath the open bottom 46 of the magazine 42. As described in U.S. patent application Ser. No. 08/624,240, the pipe return assembly 43 comprises return arms 49 for lowering pipe sections 32 from the magazine 42 and lifting pipe sections back into the magazine.

The transport assembly 44 is situated beneath the open bottom 46 of the magazine 42. The transport assembly 44 comprises a transport member 50 movably supported on an assembly frame 51 and a drive assembly 52 for driving the movement of the transport member. The drive assembly 52 serves to move the transport member 50 from a receiving position beneath the magazine 42 to an extended position at the spindle connection area 34. In the preferred embodiment, the drive assembly 52 comprises a hydraulically actuated rack and pinion gear 54. One skilled in the art will appreciate that other implementations of the drive assembly 52 are possible. For example, a hydraulic cylinder could be used to move the transport member 50.

The transport member 50 comprises a plurality of shuttle arms 55 and a plurality of pipe holding members 56. The pipe holding members 56 are adapted to receive and support a pipe section 32. In a preferred embodiment, a pipe holding member 56 is formed in each of the shuttle arms 55. One skilled in the art will appreciate that the pipe holding members 56 need not be formed in the shuttle arms 55 but could comprise a separate structure attached to the end of each of the shuttle arms. Each pipe holding member 56 further comprises a gripper device 58 for retaining and stabilizing a pipe section 32 in the pipe holding member.

In one embodiment, shown in FIG. 4, the gripper device 58 is a passive device that will engage a pipe section 32 resting in the pipe holding member 56. The gripper device 58 defines an upper concave surface 59 for receiving the pipe section 32 and is mounted to the shuttle arm 55 by a pivot pin 60, about which the gripper device is permitted to rotate. A spring 61, connected between the shuttle arm 55 and the gripper device 58, provides a rotational force to the gripper device such that the gripper device is maintained in a position to support the pipe section 32.

When the holding member 56 is receiving a pipe section 32 from one of the pipe receiving columns 48, the holding member is potentially subject to the cumulative weight of a plurality of pipe sections in the receiving column. The rotational force generated by the spring 61 may be overcome by the cumulative weight and could cause the plurality of pipe sections 32 to spill out of the magazine 42. To prevent this, the assembly frame 51 has a top surface 62 that extends beneath each of the receiving columns 48. Consequently, when the pipe holding member 56 receives a pipe section 32 and the rotational force of the spring 61 is overcome by the cumulative weight of a plurality of pipe sections in a receiving column 48, a bottom surface 63 of the gripper device 58 contacts the top surface 62 of the assembly frame 51, effectively limiting the rotation of the gripper device and preventing the pipe sections from spilling out of the receiving column.

The ability of the gripper device 58 to rotate also allows the gripper device to passively grip and release a pipe section 32 in the spindle connection area 34. As the pipe holding member 56 approaches a pipe section 32 in the spindle connection area 34, the gripper device 58 is urged down and under the pipe section as the pipe section contacts the inclined leading edge 64 of the gripper device. Conversely, as the pipe holding member 56 is pulled away from the pipe section 32 in the spindle connection area 34, the pipe section is forced against the gripper device 58 and causes a rotational force about the pivot pin 60 sufficient to overcome the supporting force generated by the spring 61. Thus, the gripper device 58 is forced down and under the pipe section 32 in the spindle connection area 34, effectively releasing the pipe section.

The gripper device 58 also comprises a contact wheel 65 rotatably mounted on the pivot pin 60. The pipe section 32 in the pipe holding member 56 rests on the circumferential perimeter of the contact wheel 65. The rotating contact wheel 65 permits the pipe section 32 to rotate more easily as it rests in the pipe holding member 56; yet the contact wheel resists axial movement of the pipe section. Preferably, the contact wheel 65 is made of a resilient material such as polyurethane.

The pipe section 32 in the pipe holding member 56 is also contacted by a resistant thumb 66 positioned on the outer edge of the pipe holding member. The resistant thumb 66 has a slightly concave surface more sharply defined at the upper edge of the resistant thumb that engages the pipe section 32. Preferably, the resistant thumb 66 is made of a resilient material such as polyurethane. The shape of the resistant thumb 66 and the proximity of its upper edge relative to the pivot pin 60 have the effect of providing little resistance to the rotation of the pipe section 32 as it is rotated in direction A. However, as the pipe section 32 is rotated in direction B, it contacts the resistant thumb 62 and attempts to rotate the gripper device 58 about the pivot pin 60. The slight rotation of the gripper device 58 causes an even tighter gripping action which resists the rotation of the pipe section 32, effectively gripping the pipe section.

Figure 5A:
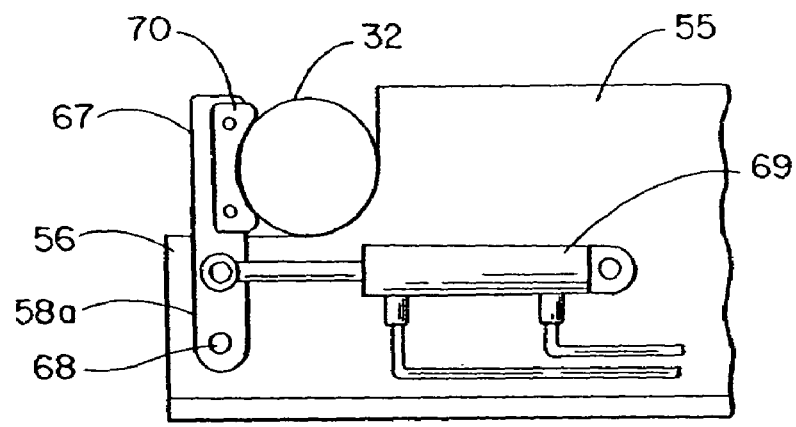
FIG. 5a is a fragmented side view of an embodiment of a pipe holding member of the pipe handling assembly of FIG. 3, in a closed position.
Figure 5B:
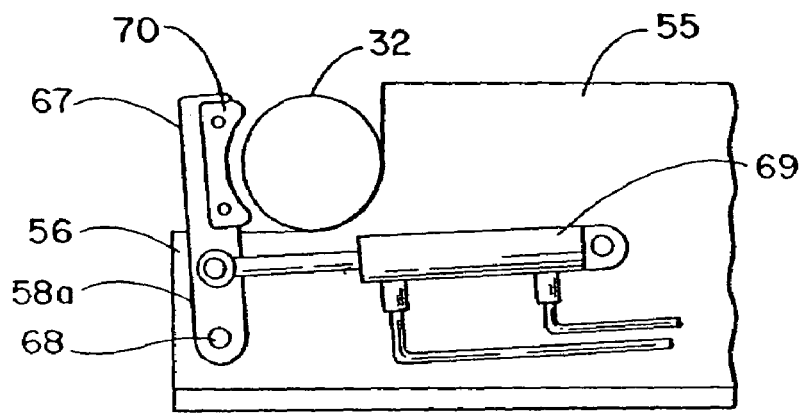
FIG. 5b is a fragmented side view of an embodiment of a pipe holding member of the pipe handling assembly of FIG. 3, in a relaxed position.
Figure 5C:
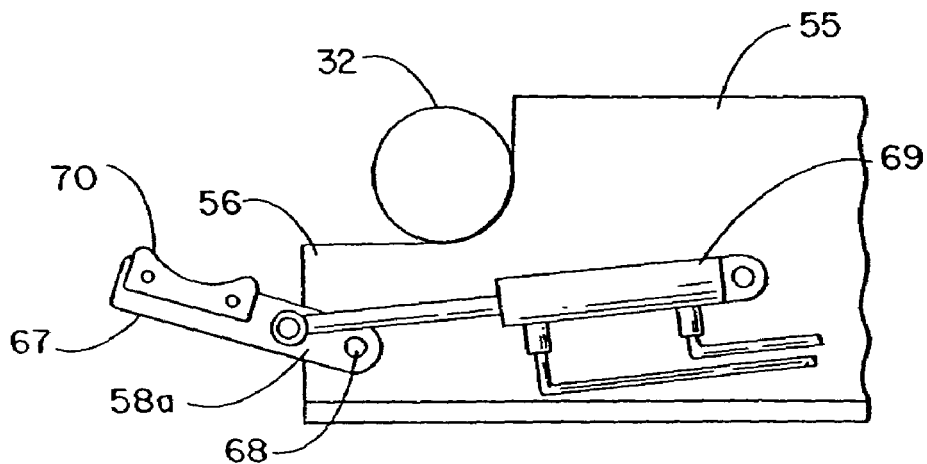
FIG. 5c is a fragmented side view of an embodiment of a pipe holding member of the pipe handling assembly of FIG. 3, in an open position.

In an alternative embodiment, depicted in FIGS. 5a–5c, the gripper device 58a is an active device and comprises a hydraulically actuated pivot arm 67. The pivot arm 67 is connected by a pivot arm pin 68 or other like mechanism to the end of the pipe holding member 56. A hydraulic cylinder 69 is connected to the pivot arm 67 such that the pivot arm can be pivoted about the pivot arm pin 68 between a first position (shown in FIG. 5a), a second position (shown in FIG. 5b), and a third position (shown in FIG. 5c). To the end of the pivot arm 67 remote from the pipe holding member 56 is attached a concave shaped grip 70 which is designed to engage the pipe section 32 in the pipe holding member when the pivot arm is fully closed in the first position as shown in FIG. 5a. When the grip 70 engages the pipe section 32, sufficient resistance is provided to prevent free rotation and free axial movement of the pipe section. In the second position, shown in FIG. 5b, the pivot arm 67 is in a relaxed position. In the relaxed position, the pipe section 32 will rest in the pipe holding member 56 and be permitted to rotate and slide in the pipe holding member. When the pivot arm 67 is in the third position, shown in FIG. 5c, the pivot arm is open and the grip 70 does not engage or retain the pipe section 32 in the pipe holding member 56.

Figure 6:
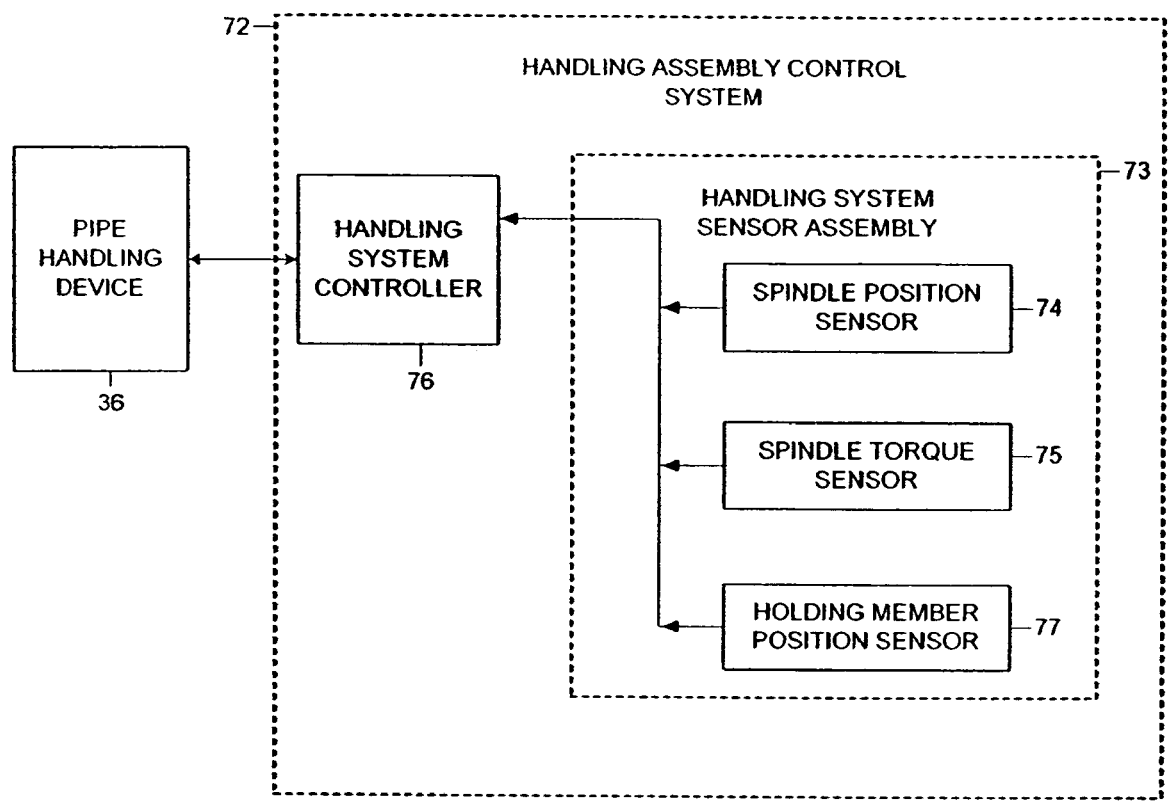
FIG. 6 is a block diagram of a circuit for controlling a pipe handling assembly in accordance with the present invention.

The present invention also provides for the automated control of the pipe handling assembly 36 by a handling assembly control system, shown in FIG. 6. The handling assembly control system 72 controls all of the underlying functions of the pipe handling assembly 36 and sequences those operations. The handling assembly control system 72 comprises a handling system sensor assembly 73 and a handling assembly controller 76. The handling system sensor assembly 73 comprises a spindle position sensor 74, a spindle torque sensor 75, and a holding member position sensor 77.

The spindle position sensor 74 tracks the position of the spindle 26 by monitoring the motor used to thrust the drill string 18 through the earth. The operation of the thrust motor can be correlated to the movement of the spindle 26 in the spindle connection area 34. Using a speed pickup sensor, for example, magnetic pulses from the motor can be counted and the direction and distance the spindle 26 has traveled can be calculated. An additional sensor or switch can be used to indicate when the spindle 26 has passed a "home" position. The magnetic pulses counted from the motor can then be used to determine how far the spindle 26 has traveled from the home position. When the spindle position sensor 74 detects the position of the spindle 26 at the back end 33 of the spindle connection area 34, it transmits a SPINDLE POSITION signal to the handling assembly controller 76. In response to the SPINDLE POSITION signal, the handling assembly controller 76 operates the pipe handling assembly 36. One skilled in the art will appreciate other methods for tracking the spindle 26 are also possible, such as photoelectric devices, mechanical devices, resistive devices, encoders, and linear displacement transducers that can detect when the spindle is in a particular position.

The spindle torque sensor 75 detects the pressure in the motor that provides rotation to the drill string 18 and transmits a spindle CONNECTION signal. A pressure transducer on the rotation motor that rotates the spindle 26 is used in calculating the torque output from the rotation motor. The amount of torque measured from the rotation motor is an indication of whether the spindle 26 is connected to the drill string 18 and experiencing resistance, or disconnected and rotating freely. In response to the SPINDLE CONNECTION signal, the handling assembly controller 76 operates the pipe handling assembly 36.

The holding member position sensor 77 detects the position of the pipe holding members 56 (see FIG. 4) by correlating the operation of the drive assembly 52 to the distance traveled by the pipe holding members 56. A speed pickup sensor on the motor of the drive assembly 52 is used to count magnetic pulses from the motor. An additional sensor or switch can be used to indicate when the shuttle arms 55 have passed a "home" position. The pulse count is correlated to the distance the shuttle arms 55, and consequently the pipe holding members 56, have traveled from the home position. The holding member position sensor 77 transmits a HOLDING MEMBER POSITION signal when the pipe holding members 56 are beneath each of the columns 48 of the magazine 42. The handling assembly controller 76 receives the HOLDING MEMBER POSITION signal and causes the pipe holding members 56 to stop beneath the appropriate column 48. Other ways for detecting the position of the pipe holding members 56 are contemplated. For example, photoelectric devices, mechanical devices, resistive devices, encoders, and linear displacement transducers may be used to indicate when the pipe holding members 56 are beneath a particular column 48.

Figure 7:
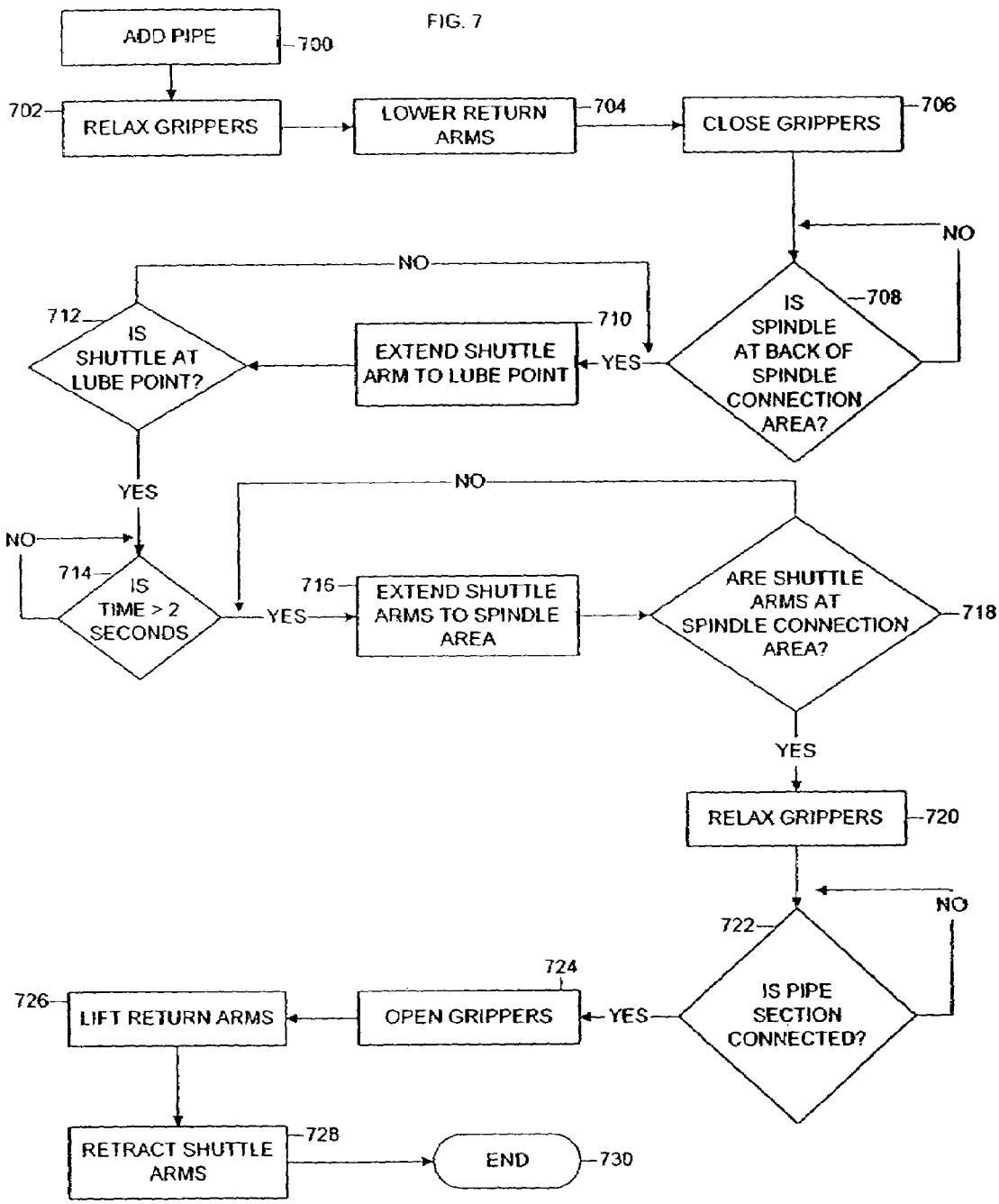
FIG. 7 is a flow diagram of a version of software for an Add Pipe routine for the pipe handling assembly controller of FIG. 6.

The flow chart of FIG. 7 depicts an example of logic followed by the handling assembly controller 76 during the boring operation when a pipe section 32 is added to the drill string 18. With reference to FIGS. 3–5 and 7, the handling assembly controller 76 will first direct a pipe section 32 be placed in the pipe holding member 56. If an active gripper device 58a is used, the handling assembly controller 76 will relax the gripper device 58a at 702. The return arms 49 then are lowered to place a pipe section 32 in the pipe holding member 56 at 704. At 706, the active gripper device 58a is closed to secure the pipe section 32 in the pipe holding member 56. The routine then waits at 708 for a SPINDLE POSITION signal indicating the spindle 26 is positioned at the back end 33 of the spindle connection area. When the SPINDLE POSITION signal is received, the handling assembly controller 76 causes the shuttle arms 55 to extend at 710 to a position where pipe joints 30 can be lubricated. When the shuttle arms 55 reach the lubrication point at 712, the handling assembly controller 76 causes the shuttle arms to pause for two seconds to allow lubricant to be applied to pipe joints 30 at 714. One skilled in the art will appreciate that the two second delay is only exemplary and that any time sufficient to allow the pipe joints to be lubricated may be used. Furthermore, if no lubrication is required, or if the shuttle arms 55 need not pause for lubricant to be applied, then the logic followed by the handling assembly controller could be modified accordingly.

The shuttle arms 55 are fully extended to the spindle connection area 34 at 716. When the shuttle arms 55 reach the spindle connection 34 area at 718, the handling assembly controller 76 will slightly relax the active gripper device 58a at 720. The routine then waits at 722 for a SPINDLE CONNECTION signal indicating that the pipe section 32 is connected to the drill string 18. After receiving the SPINDLE CONNECTION signal, the handling assembly controller 76 opens the active grippers 58a at 724. The return arms 49 are then lifted at 726, and the shuttle arms 55 are retracted to their position beneath the magazine 42 at 728. The ADD PIPE routine of FIG. 7 completes at 730.

Figure 8:
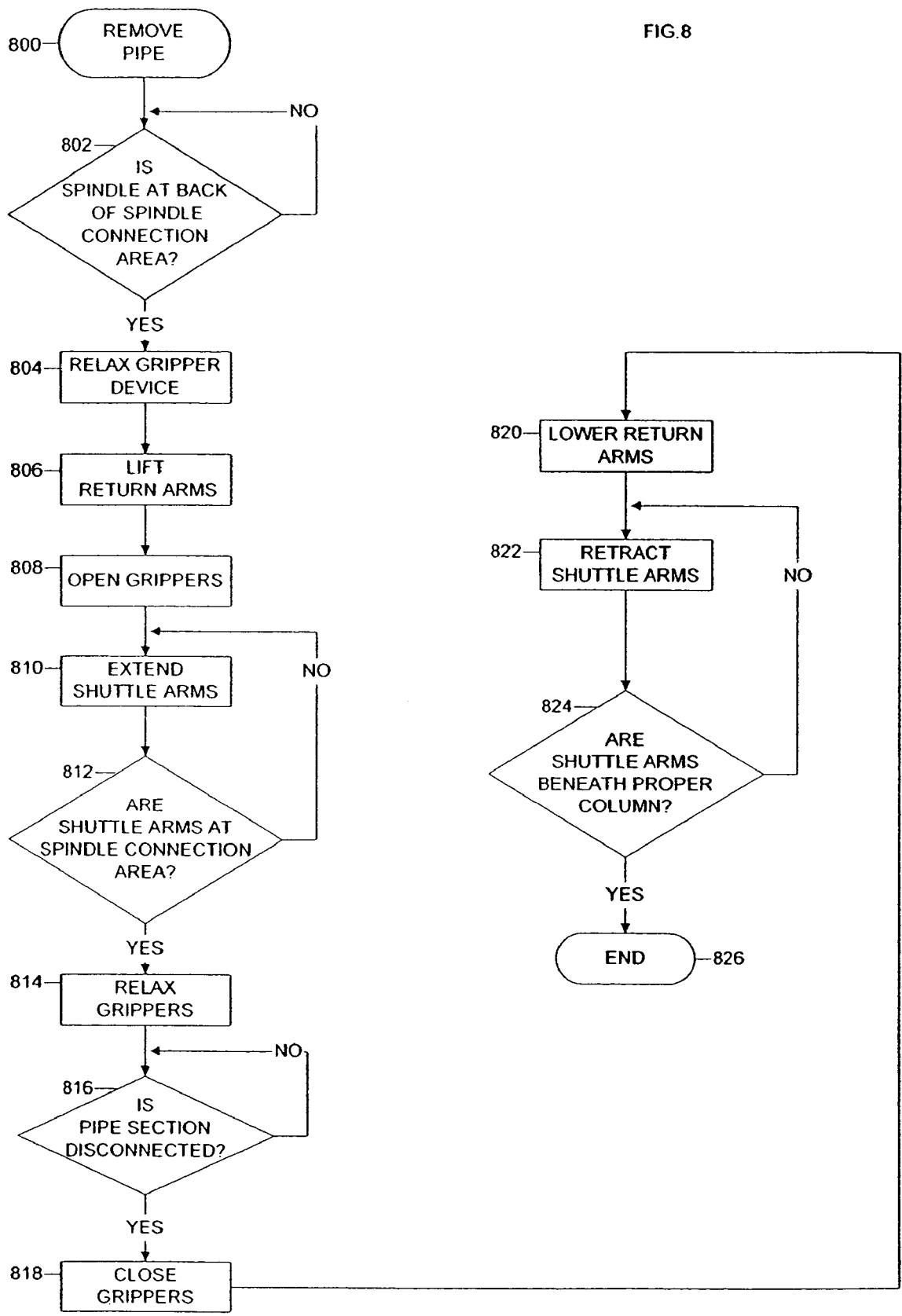
FIG. 8 is a flow diagram of a version of software for a Remove Pipe routine for the pipe handling assembly controller of FIG. 6.

The flow chart of FIG. 8 illustrates an example of logic for the handling system controller 76 during the backreaming operation when a pipe section 32 is removed from the drill string 18. The handling system controller 76 initially waits for a SPINDLE POSITION signal indicating the spindle 26 is positioned at the back end 33 of the spindle connection area 34. When the SPINDLE POSITION signal is received at 802, the handling assembly controller 76 will relax the gripper device 58a (FIG. 5) at 804, if an active gripper device is used. The return arms 49 are raised at 806 to remove any pipe section 32 that may have been resting in the pipe holding member 56. The gripper device 58a is opened at 808, and the shuttle arms 55 are fully extended to the spindle connection area 34 at 810.

When the shuttle arms 55 reach the spindle connection area 34 at 812, the handling assembly controller 76 puts the gripper device 58a in the relaxed position at 814. The routine then waits for the spindle position sensor 74 to transmit the SPINDLE POSITION signal at 816. The receipt of the SPINDLE POSITION signal at this point indicates that the pipe section 32 has been disconnected from the drill string 18 and positioned in the spindle connection area 34 so that the pipe section is aligned with the magazine 42. The handling assembly controller 76 then fully closes the gripper device 58a at 818. The return arms 49 are lowered at 820, and the shuttle arms 55 with the pipe section 32 in the pipe holding member 56 are returned to the magazine 42 at 822. When the pipe holding member 56 is beneath the proper column 48 at 824, the backreaming operation can continue at 826.

Figure 9:
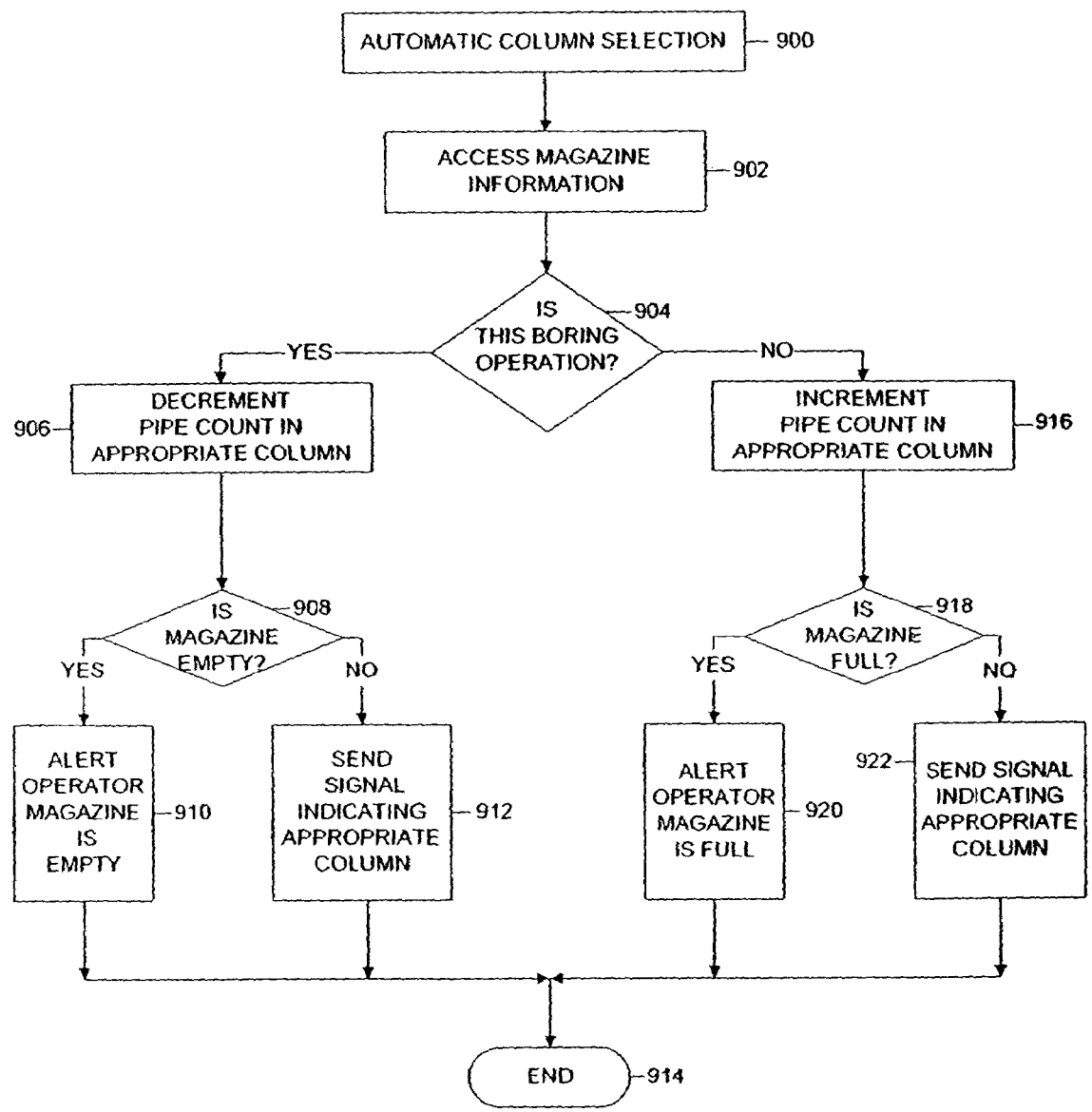
FIG. 9 is a flow diagram of a version of software for a Column Selection routine for the pipe handling assembly controller of FIG. 6.

When the shuttle arms 55 are retracted to the magazine 42, in either the boring operation or the backreaming operation, the pipe holding member 56 must be positioned below the proper column 48 of pipe in order to receive or replace a pipe section 32. The flow chart of FIG. 9 illustrates how the handling assembly controller 76 determines under which column 48 of pipe to position the pipe holding member 56.

The handling assembly controller 76 accesses information needed for tracking the number of pipe sections 32 in the magazine 42 being used at 902. The information consists of the number of pipe sections 32 the magazine 42 can hold, the number of columns 48 in the magazine, and the number of pipe sections remaining in the magazine. A check is made at 904 to determine if a pipe section 32 is being removed from the magazine 42 during the boring operation or if a pipe section is being replaced in the magazine during the backreaming operation. If a pipe section 32 is being removed, the pipe count of the appropriate column 48 is decremented at 906. At 908 a check is made to determine if the magazine 42 is empty. If the magazine 42 is empty, the operator is alerted at 910 that a new magazine is needed. Otherwise, at 912 the procedure returns information indicating which is the appropriate column 48 for receiving the next pipe section 32.

If a pipe section 32 is being added to the magazine 42 during the backreaming operation, the pipe count of the appropriate column is incremented at 916. At 918 a check is made to determine if the magazine 42 is full. If the magazine 42 is full, the operator is alerted at 920 that a new magazine is needed. Otherwise, at 922 the procedure returns information indicating which is the appropriate column 48 for returning the next pipe section 32. One skilled in the art will appreciate that other methods for properly selecting a column 48 in the magazine 42 may be used. For example, switches or photoelectric devices can be used to detect the presence or absence of pipe sections 32 in the magazine 42; and mechanical stops (either passively or actively positioned) could be used to stop the shuttle arms 55 under the appropriate column 48.

Makeup/Breakout System

Figure 10:
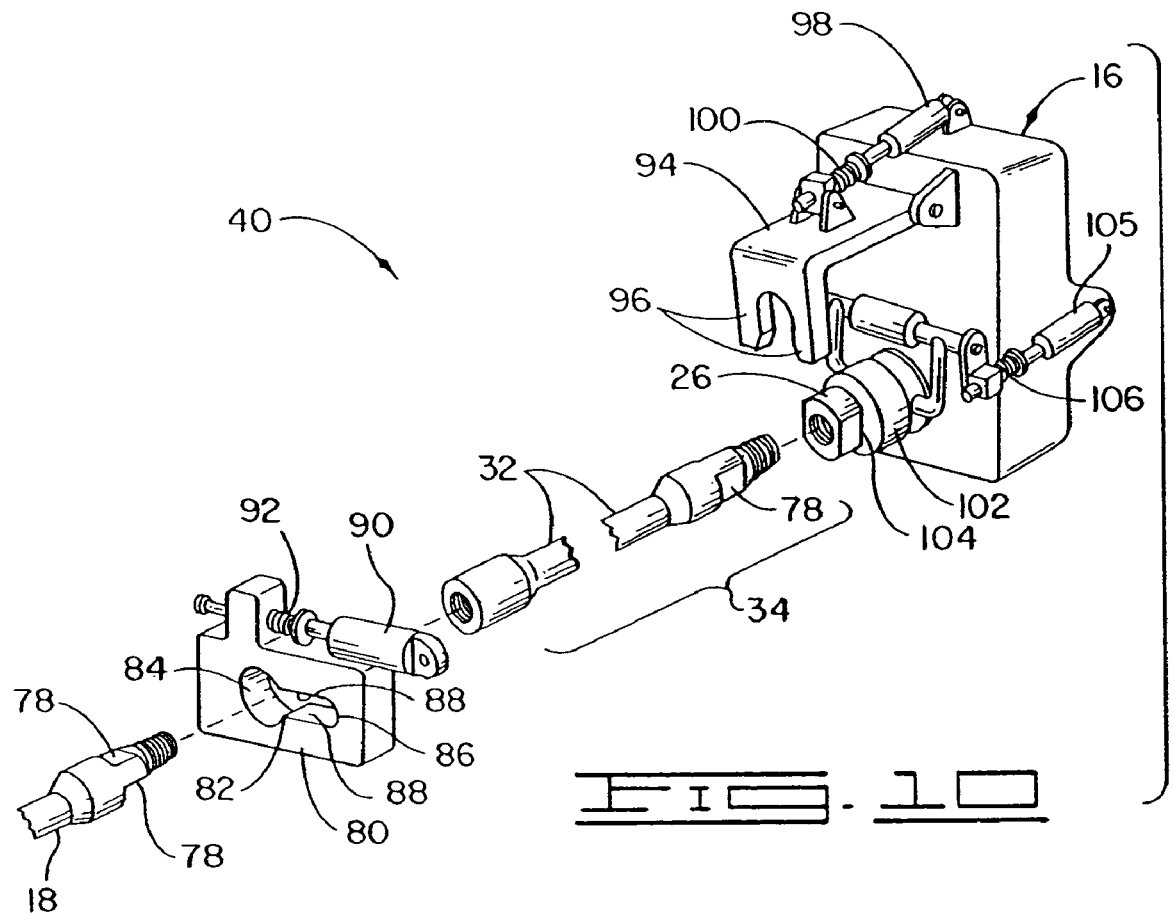
FIG. 10 is a partially cut-away, partially exploded, perspective view of one preferred embodiment of a makeup/breakout assembly.

The preferred embodiment for the makeup/breakout assembly 40 is shown in detail in FIG. 10. The makeup/breakout assembly 40 comprises a plurality of wrenches for holding the drill string 18 and the pipe section 32 in the spindle connection area 34. In the preferred embodiment, the wrenches are used with a drill string 18 comprised of pipe sections 32 having opposed flats 78 formed on the ends of the pipe sections.

A first wrench 80 secures the drill string 18. The first wrench 80 defines a keyhole opening 82 having a circular portion 84 slightly larger in diameter than the pipe section 32. The size of the circular portion 84 of the keyhole opening 82 permits a pipe section 32 to pass unobstructed through the circular portion when the first wrench 80 is in a first position.

Consequently, when the first wrench 80 is in the first position, the pipe section 32 passing through the keyhole opening 82 can rotate freely.

The keyhole opening 82 is further characterized by a slot 86 extending from the circular opening 84. The flat inner sides of the slot 86 are defined by a pair of opposing surfaces 88 positioned to engage the flats 78 of the pipe section 32 when the first wrench 80 is in a second position. In the second position, the first wrench 80 is engaged, locking the pipe section 32 in place and preventing it from rotating.

The movement of the first wrench 80 between the first position and the second position is actuated by a hydraulic cylinder 90 in conjunction with a spring 92. As the hydraulic cylinder 90 is extended, the first wrench 80 is urged from the first position to the second position. However, because of the keyhole design of first wrench 80, the first wrench can only move to the second position if the pipe section 32 is aligned so that the flats 78 will engage the opposing surfaces 88 of the first wrench. As the hydraulic cylinder 90 extends, if the pipe flats 78 are not aligned with the opposing surfaces 88, then the spring 92 will compress. When the flats 78 are aligned, the spring 92 will expand, forcing the first wrench 80 to engage the drill string 18.

The keyhole design of the first wrench 80 provides added strength to the tool because it fully encompasses the circumference of the drill string 18. However, one skilled in the art will appreciate other configurations for the first wrench 80 are possible. For example, a forked tool with tines that engage the flats 78 on the pipe section 32, as described subsequently, could be used to secure the drill string 18.

The makeup/breakout assembly 40 further comprises a second wrench 94 positioned to secure the pipe section 32 in the spindle connection area 34. The second wrench 94 is a forked tool having two tines 96. The width of the tines 96 is slightly more than the width of the flats 78 on the pipe section 32. The second wrench 94 is designed to be moved between a first position and a second position. In the second position, the second wrench 94 grips the pipe section 32 when the tines 96 engage the flats 78, preventing the pipe section 32 from rotating with the spindle 26.

The movement of the second wrench 94 is actuated by a hydraulic cylinder 98 in combination with a spring 100. As with the first wrench 80, the second wrench 94 is urged from the first position to the second position by the hydraulic cylinder 98. However, if the pipe section 32 in the spindle connection area 34 is not aligned so that the flats 78 will engage the tines 96, the spring 100 will compress. When the flats 78 are aligned, the spring 100 will expand, forcing the second wrench 94 to engage the pipe section 32 in the spindle connection area 34.

The makeup/breakout assembly 40 further comprises a slidable collar wrench 102. A collar wrench suitable for use with the present invention is described in detail in U.S. Pat. No. 5,544,712, entitled Drill Pipe Breakout Device, issued Aug. 13, 1996, the contents of which are incorporated herein by reference. The collar wrench 102 has a through-bore permitting the collar wrench to be slid over the front of the spindle 26 and to rotate with the spindle. As the collar wrench 102 is slid over the spindle 26, inwardly facing surfaces 104 on the collar wrench engage the flats 78 of the pipe section 32 in the spindle connection area 34.

The movement of the collar wrench 102 is actuated by a hydraulic cylinder 105 in combination with a spring 106. The collar wrench 102 is moved from the disengaged position to the engaged position by a hydraulic cylinder 105. However, if the pipe section 32 in the spindle connection area 34 is not aligned with the spindle 26 so that the pipe flats 78 will engage the inwardly facing surfaces 104 of the collar wrench 102, the spring 106 will compress. When the pipe flats 78 are aligned, the spring 106 will expand, forcing the collar wrench 102 to engage the pipe section 32 in the spindle connection area 34. Having the collar wrench 102 in the engaged position permits the spindle 26 to be locked to the pipe section 32 so that the pipe section can rotate with the spindle when the threaded connection between the spindle and pipe section has been broken.

One skilled in the art will appreciate that other designs for the wrenches are contemplated. For example, other geometric shapes capable of transmitting torque would be appropriate for the spindle collar wrench. Any number of flats on the end of the pipe section 32 could be configured to engage a corresponding number of surfaces on the inside of the spindle collar wrench 102, thereby locking the spindle 26 to the pipe section in the spindle connection area 34. Similarly, the first wrench 80 and the second wrench 94 could be designed to have a corresponding number of surfaces that would engage the arrangement of flats on the end of the pipe sections 32. The wrenches could be maneuvered to engage the flats, effectively clamping the pipe section 32 and the drill string 18 to prevent any rotation.

Figure 11:
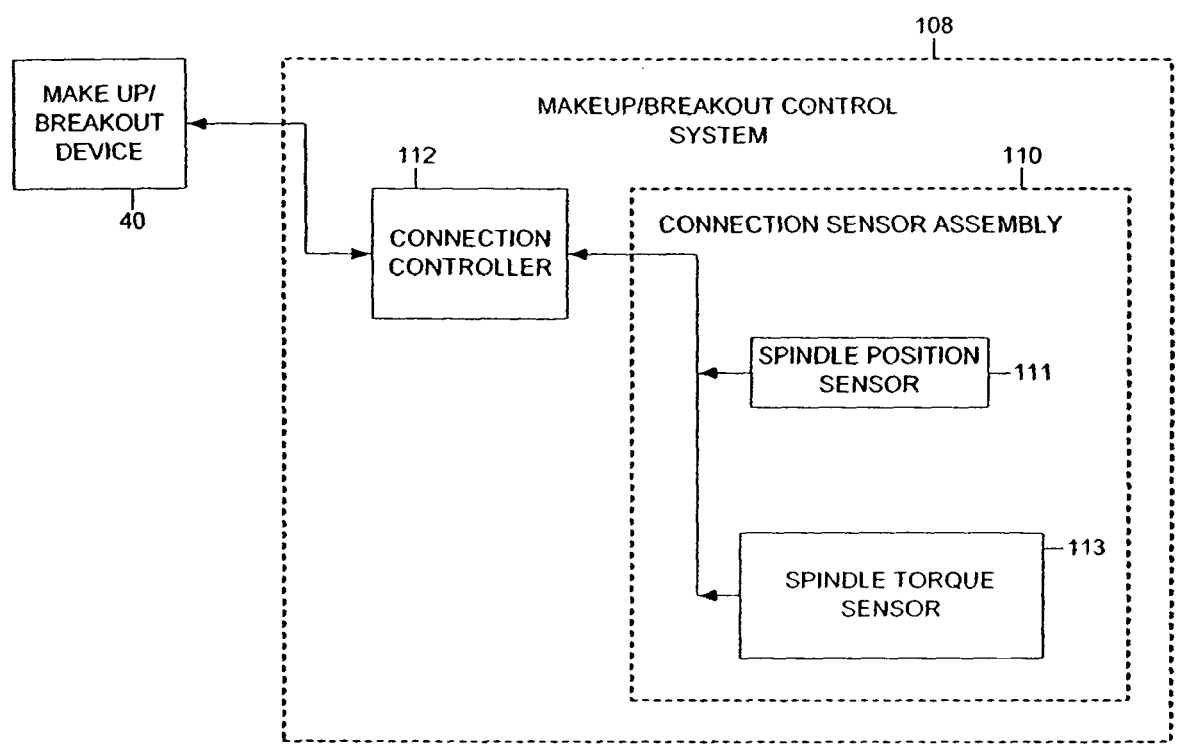
FIG. 11 is a block diagram of a circuit for controlling the makeup/breakout assembly of FIG. 10.

The present invention also provides for the automated control of the makeup/breakout assembly 40 by a makeup/breakout control system 108, shown in FIG. 11. With reference to FIG. 10, the makeup/breakout control system 108 automatically coordinates the operation of the makeup/breakout assembly 40 during the process of adding and removing pipe sections 32 to and from the drill string 18. The makeup/breakout control system 108 comprises a connection sensor assembly 110 and a connection controller 112. The connection sensor assembly 110 comprises a spindle position sensor 111 and a spindle torque sensor 113.

The spindle position sensor 111 detects the position of the spindle 26 by monitoring the motor used to thrust the drill string 18 and correlating revolutions of the motor to the distance the spindle travels. The spindle position sensor 111 detects the position of the spindle 26 in the spindle connection area 34 and transmits a spindle position signal to the connection controller 112. The spindle torque sensor 113 detects when the spindle 26 is connected to the drill string 18 by monitoring the pressure in the motor that provides rotation to the drill string. The spindle torque sensor 113 transmits a spindle connection signal to indicate that the spindle 26 is or is not connected to the drill string 18. In response to the spindle position signal and the spindle connection signal, the connection controller 112 will operate the makeup/breakout assembly 40.

Figure 12:
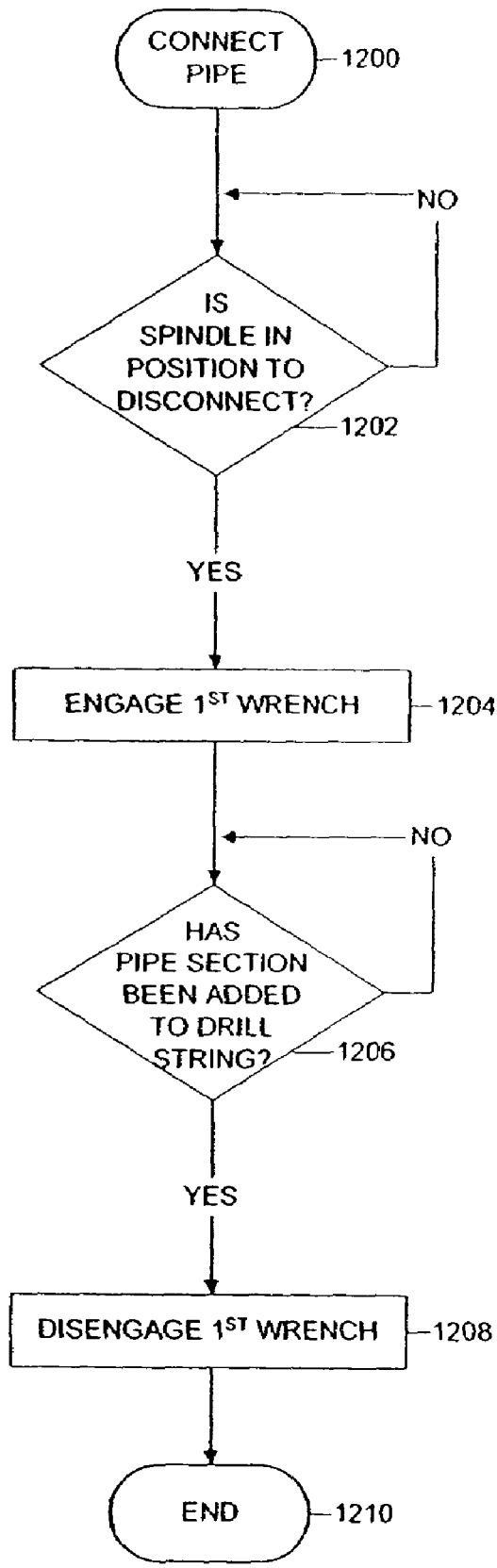
FIG. 12 is a flow diagram of a version of software for a Connect Pipe routine for the connection controller of FIG. 11.

The flow chart of FIG. 12 depicts an example of logic used by the connection controller 112 during the boring operation when a pipe section 32 is added to the drill string 18. With reference to FIGS. 10 and 11, the connection controller 112 initially waits for the SPINDLE POSITION signal at 1202, indicating that the spindle 26 is at the back end 33 of the spindle connection area 34 so that the pipe section 32 can be added to the drill string 18. After receiving the SPINDLE POSITION signal, the connection controller 112 engages the first wrench 80 at 1204, effectively securing the drill string 18 and preventing its rotation. Of the plurality of wrench devices, only the first wrench 80 is used during the boring operation. With the first wrench 80 engaged, the spindle 26 can be removed from the drill string 18 by reverse rotation and moved to the back end 33 of the spindle connection area 34.

After a pipe section 32 is placed in the spindle connection area 34, rotating and advancing the spindle 26 connects the spindle to the pipe section 32 and the pipe section to the drill string 18. With the first wrench 80 engaged, the rotation of the spindle 26 and the pipe section 32 in the spindle connection area 34 will make up the connection between the pipe section and the drill string 18. When the connection is made, the SPINDLE CONNECTION signal is received at 1206, indicating the pipe section 32 has been added to the drill string 18. The first wrench 80 is then disengaged at 1208 so that the boring operation can proceed at 1210.

Figure 13:
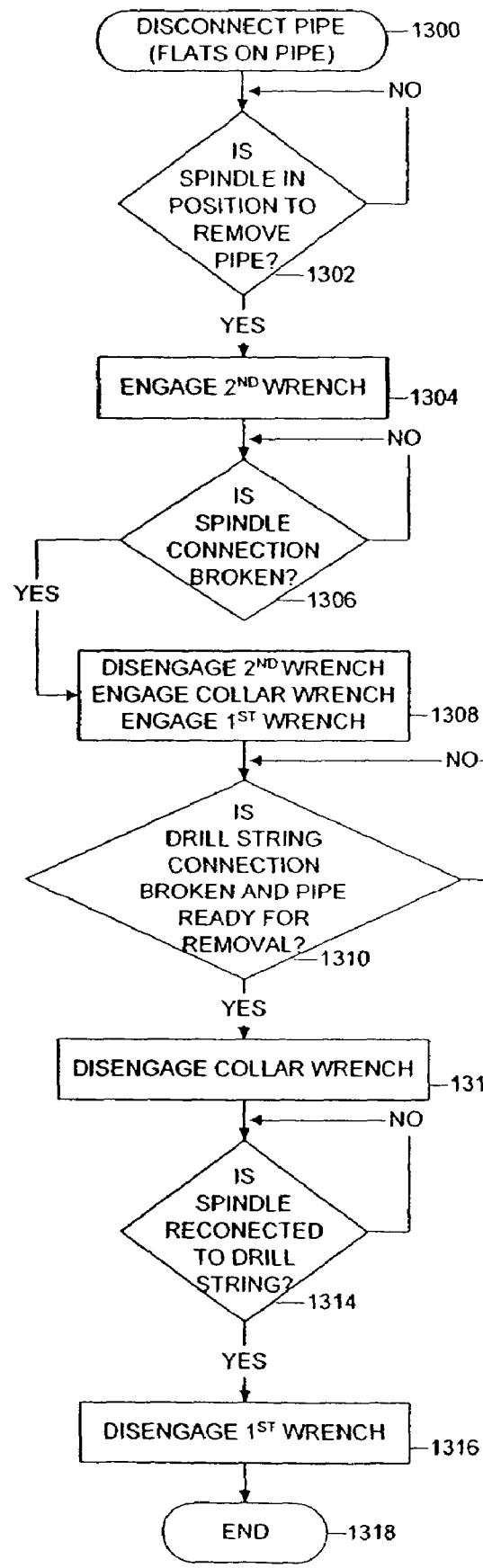
FIG. 13 is a flow diagram of a version of software for a Disconnect Pipe routine for the connection controller of FIG. 11.

The flow chart of FIG. 13 illustrates an example of logic used by the connection controller 112 during the backreaming operation when a pipe section 32 is removed from the drill string 18. With reference to FIGS. 10 and 11, the routine waits at 1302 for the spindle position signal indicating that the spindle 26 has pulled back so that the pipe section 32 to be removed from the drill string 18 is in the spindle connection area 34. After receiving the spindle position signal, the connection controller 112 engages the second wrench 94 at 1304 to secure the pipe section 32 in the spindle connection area 34. As the spindle 26 is reverse rotated, the connection between the spindle and the pipe section 32 will be broken and the spindle torque sensor 113 will transmit the spindle connection signal. After receiving the spindle connection signal at 1306, the connection controller 112 then disengages the second wrench 94 and engages the first wrench 80 and the collar wrench 102 at 1308.

With the collar wrench 102 engaged, the pipe section 32 will be locked to the spindle 26 and will rotate with the spindle, despite the connection being broken. The rotation of the spindle 26 and the pipe section 32 will then cause the connection to the drill string 18 to be broken and the spindle connection signal will be received at 1310. The connection controller 112 then disengages the collar wrench 102 at 1312, and the pipe section 32 in the spindle connection area 34 can be removed by the pipe handling assembly 36.

After the pipe section 32 is removed from the spindle connection area 34, the spindle 26 is moved forward and reconnected to the drill string 18. When the spindle 26 reconnects to the drill string 18, the spindle position signal from the spindle position sensor 111 is received by the connection controller 112 at 1314. The first wrench 80 is then disengaged at 1316 and the backreaming operation can proceed at 1318.

Figure 14:
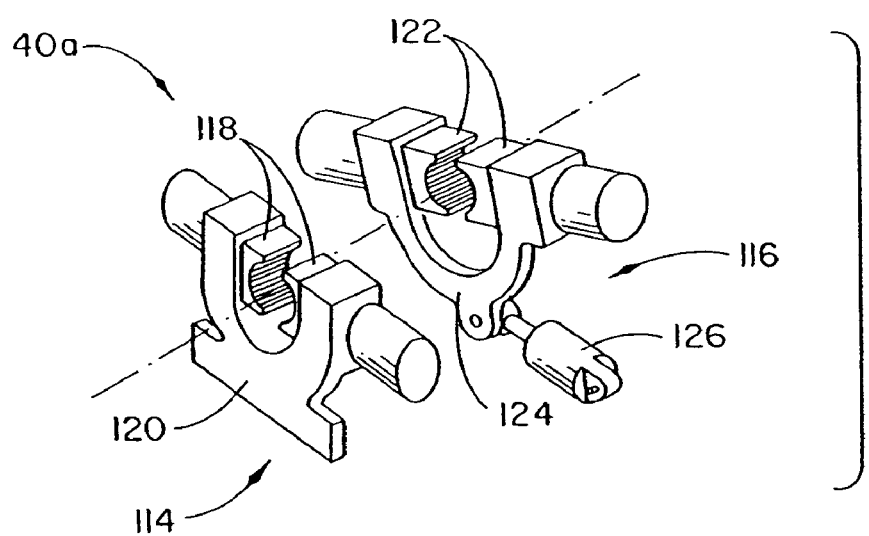
FIG. 14 is a partially cut-away, perspective view of an alternative embodiment of a makeup/breakout assembly.

An alternative embodiment for the makeup/breakout assembly is shown in detail in FIG. 14. The embodiment shown therein may be used with or without pipe sections 32 having flats 78. In this alternative embodiment, the makeup/breakout assembly 40a comprises a first wrench 114 and a second wrench 116. The first wrench 114 is positioned to secure the drill string 18. The second wrench 116, adjacent to the first wrench 114, is positioned to secure the pipe section 32 in the spindle connection area 34.

The first wrench 114 comprises a hydraulically actuated pair of gripping members 118. The gripping members 118 are positioned on opposite sides of the drill string 18 and are supported by a horseshoe-shaped holding member 120. The holding member 120 is attached to the frame 14 to anchor the first wrench 114. When activated, the gripping members 118 are pressed against the drill string 18, securing the drill string and preventing it from rotating.

The second wrench 116 comprises a second hydraulically actuated pair of gripping members 122. The gripping members 122 of the second wrench 116 are positioned on opposite sides of the pipe section 32 in the spindle connection area 34. When the gripping members 122 are engaged, the gripping members grasp and secure the pipe section 32 in the spindle connection area 34. A rotatable horseshoe-shaped holding member 124 supports the gripping members 122. The holding member 124 is rotatable to permit the connection between the pipe section 32 in the spindle connection area 34 and the drill string 18 to be broken. The rotation of the holding member 124 is controlled by a hydraulic cylinder 126 connected at the base of the holding member 124. As the hydraulic cylinder 126 is operated, the holding member 124 and the pipe section 32 it is holding are rotated slightly. The slight rotation of the pipe section 32 in the spindle connection area 34, in conjunction with the drill string 18 being secured by the first wrench 114, permits the connection to be broken.

The instant embodiment of the invention also provides for the automated control of the makeup/breakout assembly 40a by the makeup/breakout control system 108, shown in FIG. 11 and described previously. As with the previously described embodiment, the makeup/breakout control system 108 automatically coordinates the operation of the makeup/breakout assembly 40a during the process of adding and removing pipe sections 32 to and from the drill string 18. During the boring operation when only the first wrench 114 is used, the logic followed by the connection controller 112 of the present embodiment is the same as the logic shown in the flow chart of FIG. 12 and described previously. However, during the backreaming operation when both wrenches 114 and 116 are used, the logic followed by the connection controller 112 is slightly different.

Figure 15:
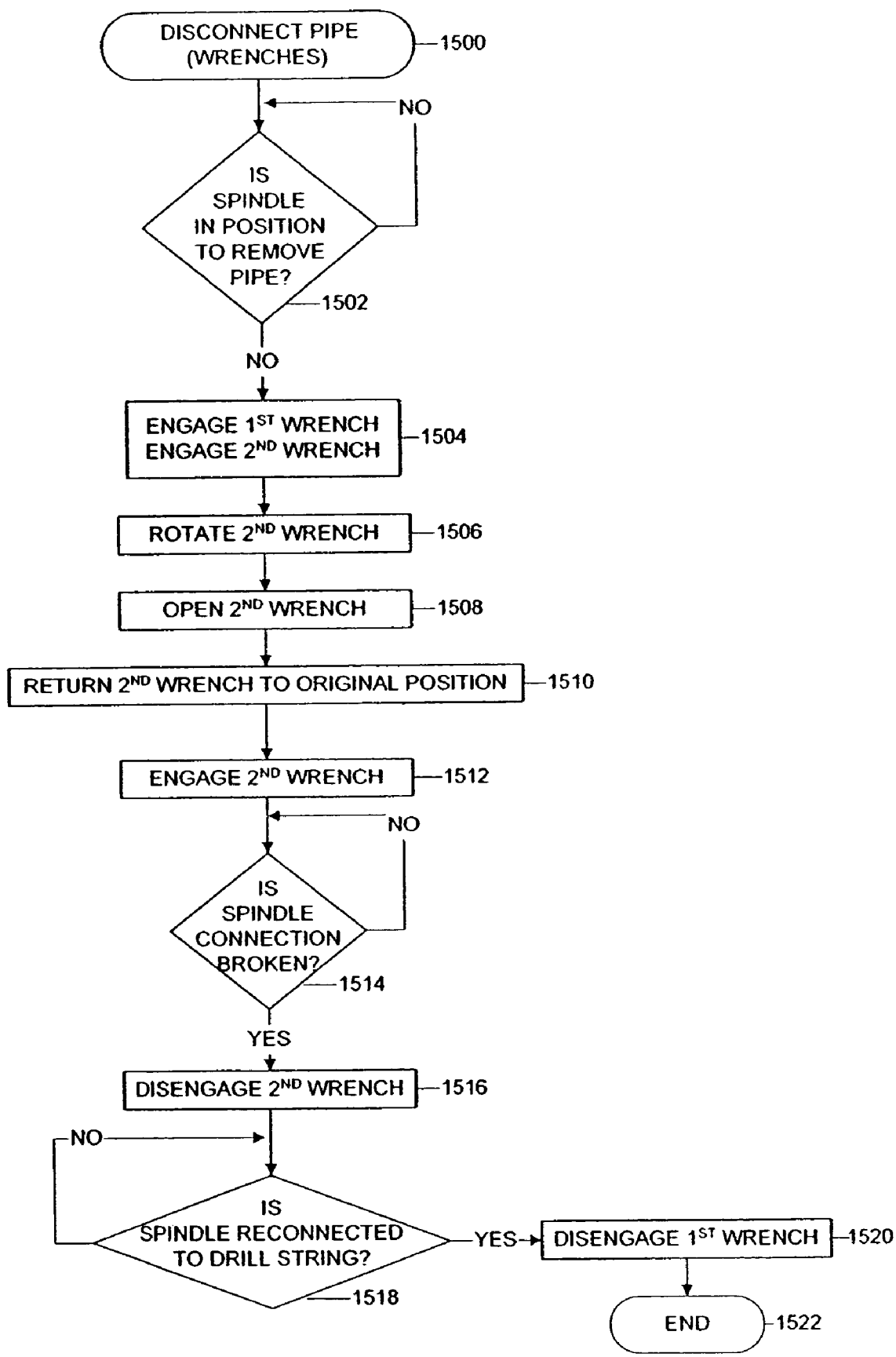
FIG. 15 is a flow diagram of an alternative version of software for a Disconnect Pipe routine for the controller of FIG. 11.
Figure 15:
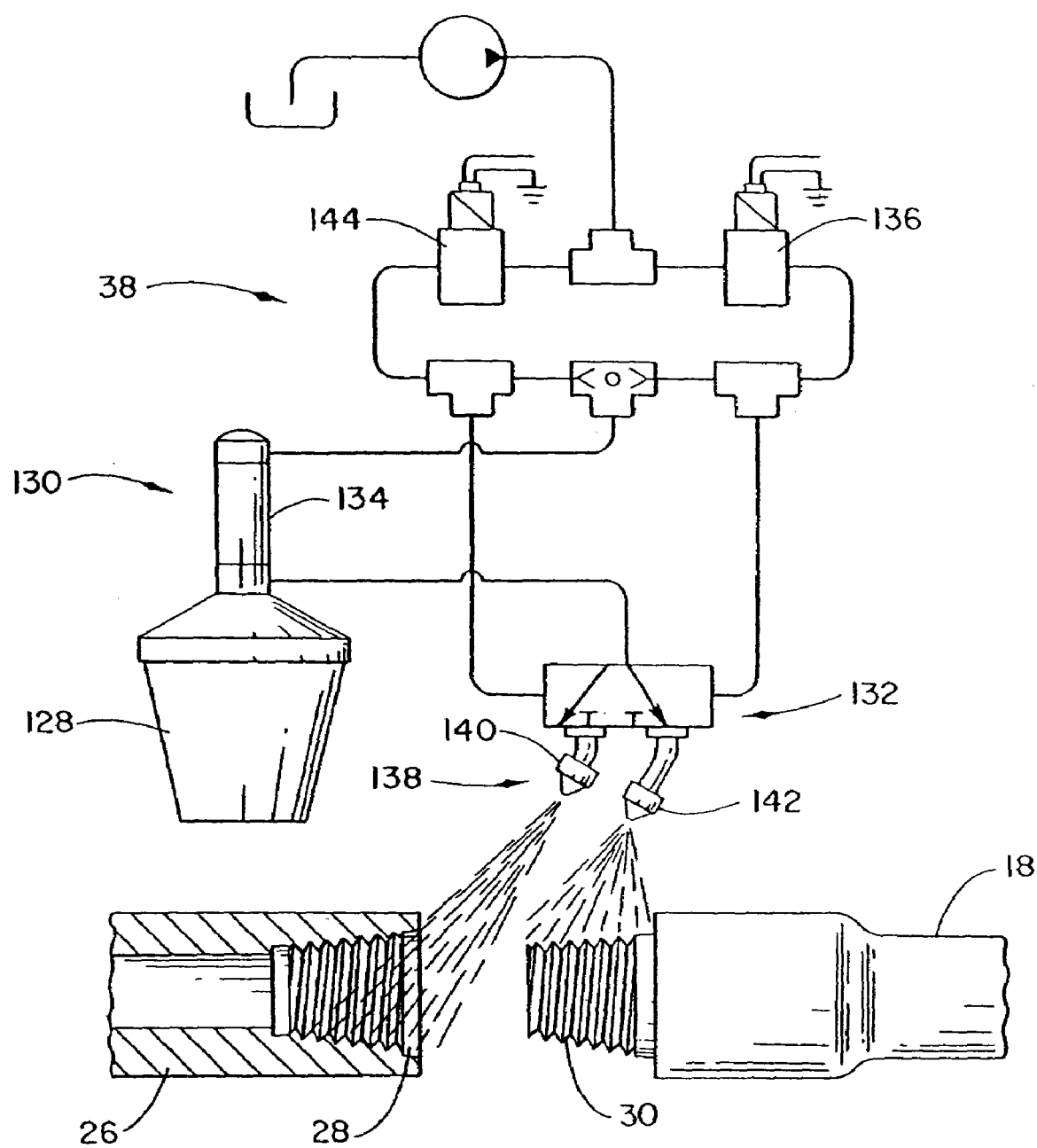

The flow chart in FIG. 15 illustrates an example of logic used by the connection controller 112 during the backreaming operation when the wrenches of FIG. 14 are used. The routine waits at 1502 for the spindle position signal indicating that the spindle 26 has pulled back so that the pipe section 32 to be removed from the drill string 18 is in the spindle connection area 34. After receiving the spindle position signal, the connection controller 112 engages the first wrench 114 at 1504 to secure the drill string 18. The connection controller 112 engages the second wrench 116 at 1504 to secure the pipe section 32 in the spindle connection area 34.

The hydraulic cylinder 126 is activated at 1506, rotating the holding member 124, the second wrench 116, and the pipe section 32 in the spindle connection area 34. The slight rotation breaks the connection between the pipe section 32 and the drill string 18. The second wrench 116 is disengaged at 1508 and rotated back to its original position at 1510. The connection controller 112 engages the second wrench at 1512, securing the pipe section 32 in the spindle connection area 34 again. The spindle 26 can now be reverse rotated to break the connection between the spindle 26 and the pipe section 32 in the spindle connection area 34.

When the connection is broken, the spindle torque sensor 113 will transmit the spindle connection signal. After receiving the spindle connection signal at 1514, the connection controller 112 disengages the second wrench 116 at 1516, and the pipe section 32 in the spindle connection area 34 can be removed by the pipe handling assembly. With the pipe section 32 removed from the spindle connection area 34, the spindle 26 is moved forward and reconnected to the drill string. After the spindle 26 reconnects to the drill string 18, the connection controller 112 receives the spindle connection signal at 1518 and disengages the first wrench 114 at 1520. The backreaming operation then can proceed at 1522.

Figure 34:
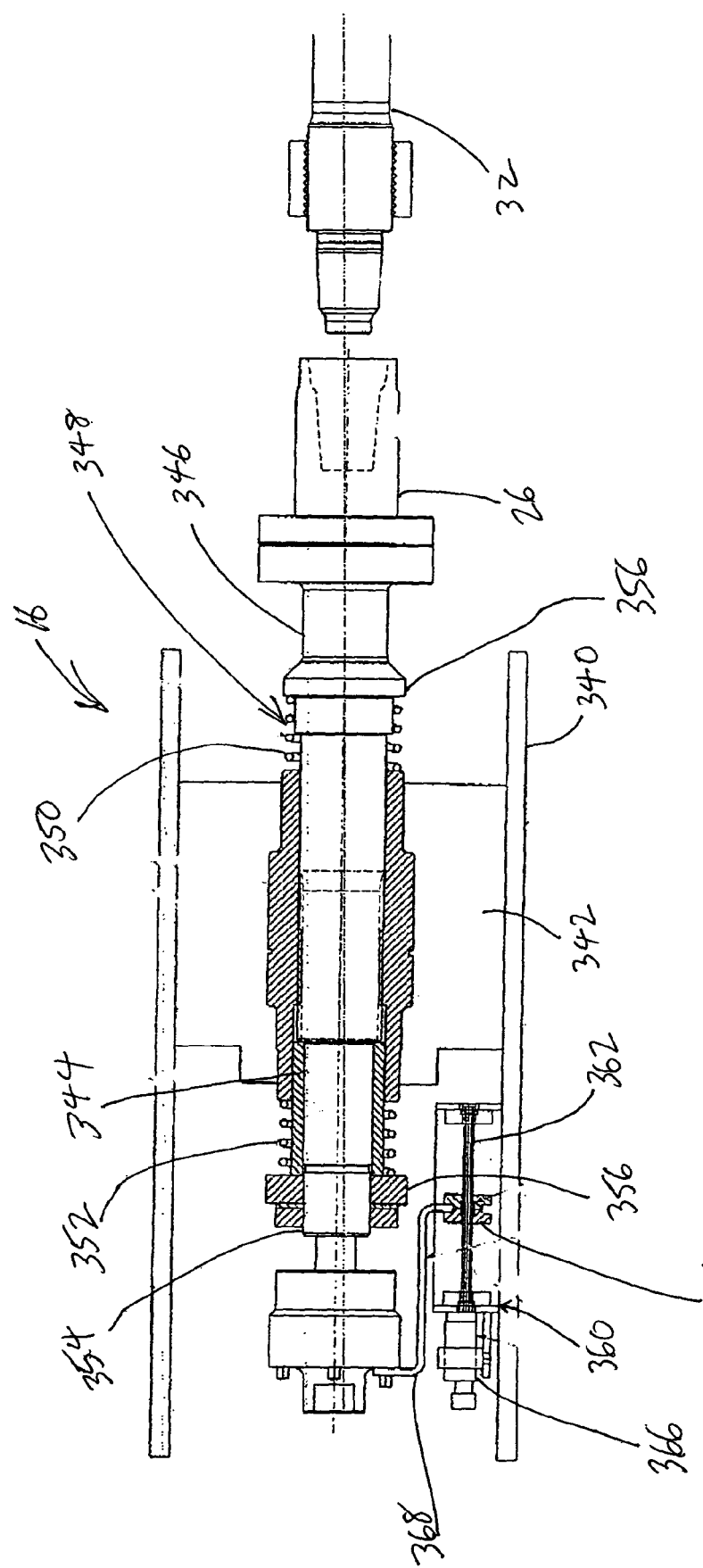
FIG. 34 is a partial cut-away, perspective view of a preferred embodiment of a float sensor for use with a boring machine and drive system.

With reference now to FIG. 34, there is shown therein an embodiment of a system for use in coordinating the thrust and rotation during the makeup and breakout operations. As discussed with reference to FIG. 2, the drive system 16, sometimes referred to as the carriage, is connected to the pipe section 32 by way of the spindle 26. The drive system 16 further comprises a drive frame 340, a rotation drive 342 such as a gearbox, and a rotation shaft 344. The rotation drive 342 is mounted rigidly to the drive frame 340. The rotation shaft 344 preferably passes through the rotation drive 342 so that the shaft may be rotated by the rotation drive. The spindle 26 is attached to a front end 346 of the rotation shaft 344. In makeup and breakout operations, the rotation drive 342 rotates the rotation shaft 344, and in kind the spindle 26, in either the clockwise direction to connect or in the counterclockwise direction to disconnect from the pipe section 32. Thrust forces, in coordination with the rotation forces, are applied to the drive frame 340 to move the spindle 26 toward or away from the pipe section 32 to thread or unthread the spindle to or from the pipe section.

Generally, the rotation shaft 344 is characterized by an amount of axial float relative to the rotation drive 342. The float associated with the shaft 344 permits the shaft to move axially relative to the rotation drive 342 and independent of the thrust forces on the drive frame 340. The characteristic float allows for some rotation or thrust movements without coordination during the makeup and breakout operations.

A biasing member 348 is used to maintain the rotation shaft 344 substantially in the center of a float range when the shaft is at rest or unloaded. Preferably, a plurality of springs 350 and 352 are use to bias the rotation shaft 344 to the center float position. A first spring 350 is located proximate the front end 346 and a second spring 352 is located proximate the aft end 354 of the rotation shaft 344. The springs 350 and 352 are positioned around the rotation shaft 344 and between the gearbox 342 and retaining collars 356. Preferably, there is a physical stop (not shown) to regulate the amount of float and limit the permitted float to only a few inches, which can be accomplished using the springs 350 and 352 or other physical mechanisms.

A float sensor 360 is used to measure the relative amount of float between the rotation shaft 344 and the drive frame 340. Preferably, the float sensor 360 is an electromagnetic absolute position sensor, though other devices could also be used, such as linear variable displacement transducers, photoelectric devices, resistive potentiometers, and ultrasonic sensors. In the embodiment illustrated in FIG. 34, the float sensor 360 comprises a sensor rod 362, a magnet 364, and associated electronics 366. The sensor rod 362 is secured to the drive frame 340. The magnet 364 is coupled to the rotation shaft 344 by a sensor guide 368. The magnet 364 is positioned to move along the sensor rod 362 as the rotation shaft 344 floats relative to the drive frame 340. The associated electronics 366 determine the position of the magnet 364 along the length of the sensor rod 362 and transmit a float signal indicative of the amount of relative float. Electromagnetic absolute position sensors suitable for use with the float sensor 360 of the present invention are the MTS Temposonics Position Sensors available from MTS Systems Corp.

Figure 35:
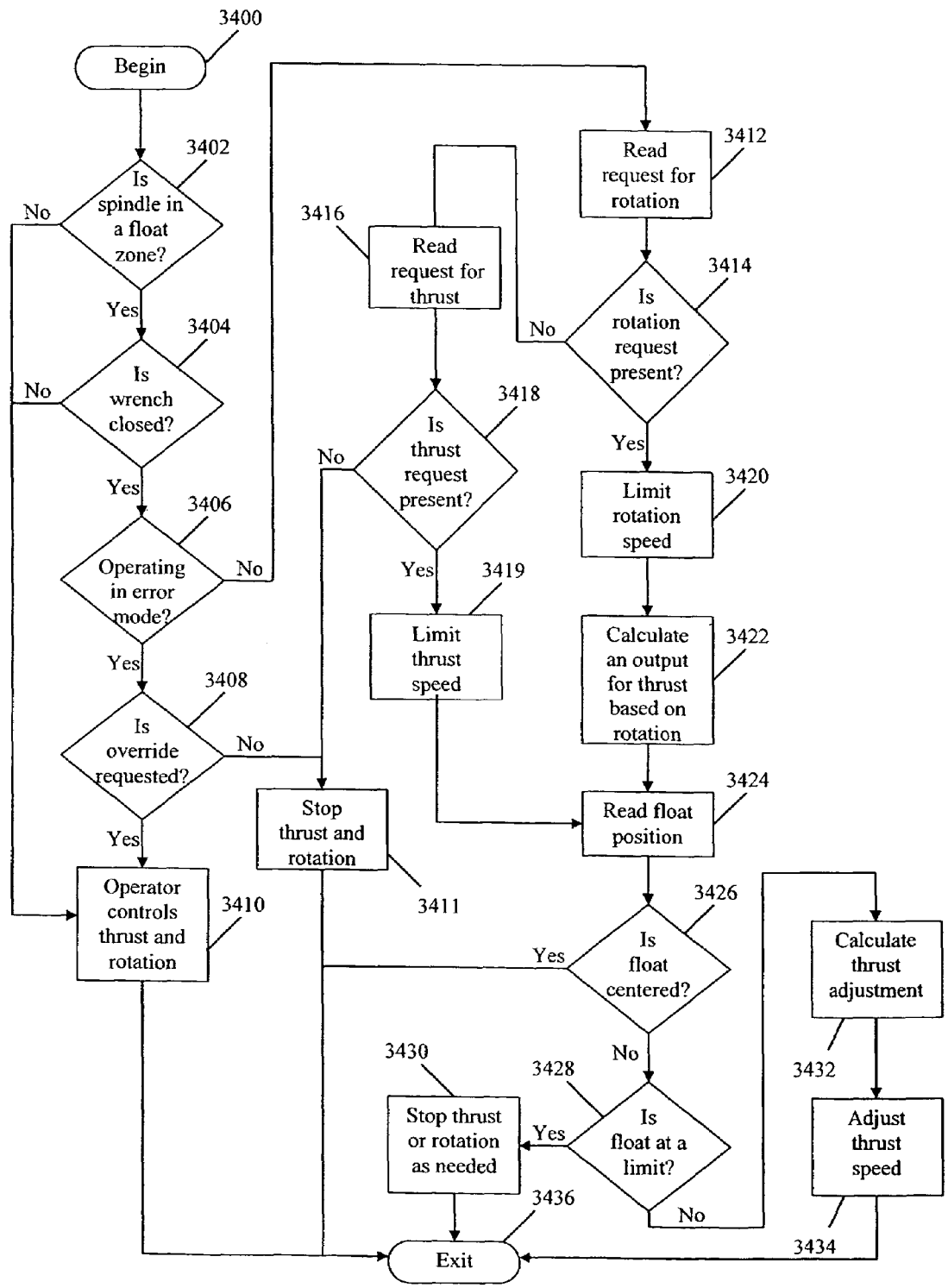
FIG. 35 illustrates a flow diagram of software for the connection controller of FIG. 11 during a boring operation.

The present invention also provides for use of the float sensor 360 to automatically assist with coordination of thrust and rotation forces in makeup and breakout operations. The connection controller 112 may be used in either a fully automatic makeup and breakout operation, or to assist the operator when makeup and breakout operations are manually accomplished. Referring now to FIG. 35, there is shown therein a flowchart illustrating an example of logic used by the connection controller 112 during the boring operation and, more particularly, during the makeup and breakout operations. Initially, the connection controller 112 waits for the spindle position signal at 3402 indicating that the spindle 26 is in position to connect or disconnect from a pipe section 32 at the end of the drill string 18. The controller 112 then checks at 3404 to see if the first wrench 114 (with reference to FIG. 14) is engaged. Preferably, the check of the first wrench 114 may be done with a proximity switch (not shown) or by checking the pressure in the hydraulics used to operate the wrench. Alternatively, any check may be made of the boring machine 10 operation to see if a makeup/breakout operation is in progress. If either of the conditions of steps 3402 and 3404 are not met, the boring machine is not in the makeup or breakout operation, so no control of thrust and rotation for assisted makeup is needed.

If the conditions at 3402 and 3404 are met, then a check is made at 3406 to see if the float sensor 360 is operating properly. If the sensor 360 is not operating properly, a check is made at 3408 to see if the operator has requested to override operation of the float sensor 360. If the override has been requested, then control of thrust and rotation is given to the operator at 3410. If no override has been requested at 3408, the controller 112 sends a signal to the machine controller 170 (shown in FIG. 22) at 3411 to stop thrust and rotation. One skilled in the art will appreciate that the connection controller 112 may also send a signal directly to the drive system 16 to stop thrust and rotation of the spindle 26, or the functionality of the connection controller 112 may be incorporated into the machine controller 170.

If no error is detected at 3406, a request for input to the rotation pump of the drive system 16 is read at 3412. A request for input may be made by an operator or from an automated control sequence. If there is no request for rotation present, as evidenced by the check at 3414, the request for input to the thrust pump of the drive system 16 is read at 3416. If there is also no request for thrust present, checked at 3418, then the controller 112 sends a signal to the machine controller 170 to stop thrust and rotation of the spindle 26 at 3411. If there is a request for thrust present, but no request for rotation, then the spindle 26 is being moved toward or away from the pipe section 32 and the controller 112 sends a signal to the machine controller 170 at 3419 to limit the thrust to a speed less than full speed, such as 60% of full speed.

If the controller 112 had determined a request for rotation was present at 3414, then the spindle 26 is being connected to or disconnected from the pipe section 32 and the connection controller 112 sends a signal at 3420 to the machine controller 170 to limit rotation to a speed less than full speed, such as 50% of full speed. At 3422, the thrust output is calculated to coordinate with the current rate of rotation. In the preferred embodiment, the thrust is calculated using the formula THRUST=ROTATION/CONSTANT, where the CONSTANT may be determined from the amount rotation needed to advance a given distance of thrust. However, any comparable formula designed to coordinate thrust with rotation for a given thread pattern or rotation pump and thrust pump response may also be used.

At 3424, the connection controller 112 reads the FLOAT SIGNAL sent by the float sensor 360. If the float is substantially centered, as checked at 3426, the program begins again at 3400 to continue monitoring the operation. If the float is not substantially centered, a check is made at 3428 to see if the float has advanced or retracted to a predetermined threshold or limit. In the preferred embodiment this limit would preferably be before the float reached the physical stop as earlier described. If a limit has been reached, the controller 112 sends a signal at 3430 to the machine controller 170 to stop thrust or rotation as needed.

By way of example, if the float is at its forward limit, then either the spindle 26 is rotating clockwise too quickly or the drive frame 340 is being retracted too quickly. Alternatively, if the float is at its rearward limit, then either the spindle 26 is rotating counterclockwise too quickly or the drive frame 340 is being advanced too quickly. Based on values determined at 3412 and 3416, the connection controller 112 will send a signal to assist with the makeup/breakout operation. One skilled in the art will also appreciate that the sensed conditions are also dependent on the configuration of the float sensor 360. The float sensor 360 may, for example, alternatively be secured to the rotation shaft 344 while the magnet 364 is secured to the drive frame 340.

If the float is not at its limits, as measured at 3428, then the connection controller 112 calculates at 3432 an adjustment to the thrust based on how far from center the FLOAT SIGNAL indicates the float is. This is a simple proportional feedback control system. Other systems such as a PI (proportional integral) or PID (proportional integral derivative) would be contemplated as appropriate with the current invention. Additionally, the system could increment or decrement thrust by a known amount until a desired effect is achieved. At 3434, the connection controller 112 will send a signal to the machine controller 170 to adjust the thrust speed. When the EXIT 3436 of the program is reached, the process loops to 3400 to continue to monitor the operation.

Pipe Lubrication System

Lubricating pipe joints 30 is helpful to prevent the pipe joints from forming too securely. If a lubricant is not used on the pipe joints 30, galling is possible. Galling can occur when pipe sections 32 of similar material and similar hardness are threaded together without lubricant, causing the pipe joints 30 to fuse together. Therefore, it is desirable to synchronize lubrication of the pipe joints 30 with the making and breaking of drill string 18 connections. One skilled in the art will appreciate that other methods of preventing galling may be used. For example, pipe sections of dissimilar materials or dissimilar hardness could be used. Alternatively, a permanent coating could been used on the pipe joints so that no lubrication is required. Drill pipe with a permanent coating used to prevent galling has appeared in this and related industries, and is disclosed *Innovative Technology for Tubular Connection to Eliminate Thread Compound Grease*, E. Tsuru et al., presented at the 1997 SPE/IADC Drilling Conference, SPE/IADC 37649. If a permanent coating technique or the like is used, no lubrication would be required and the present invention could be implemented without using a lubrication technique. However, as drill pipe requiring lubrication to prevent galling is currently prevalent, the present invention also contemplates a pipe lubrication assembly 38 to lubricate pipe joints 30 as required.

Shown in FIG. 16, the pipe lubrication assembly 38 comprises a lubricant reservoir 128, a pump system 130, and an applicator 132. In the preferred embodiment, the pump system 130 comprises a hydraulic pump 134 that transfers lubricant from the reservoir 128 to the applicator 132. When the pipe joints 30 to be lubricated are in the proper position, a first valve 136 and a second valve 144 supply hydraulic pressure to the hydraulic pump 134. The hydraulic pump 134 produces a rapid, high pressure lubricant to the applicator 132. The applicator 132 comprises a nozzle assembly 138 that sprays lubricant onto pipe joints 30. During the boring operation, lubricant is alternately applied to the connections at both ends of the pipe section 32 that is to be added to the drill string 18. Consequently, the nozzle assembly 138 preferably comprises a pair of spray nozzles 140 and 142. A first spray nozzle 140 is positioned to apply lubricant to the spindle pipe joint 28. A second spray nozzle 142 is positioned to apply lubricant to the exposed pipe joint 30 of the drill string 18. The lubricant is applied after the spindle 26 disconnects from the drill string 18, prior to when a new pipe section 32 is connected to the drill string.

During the backreaming operation, lubricant preferably is applied only to the exposed pipe joint 30 of the drill string 18 since the spindle 26 will connect to the drill string in preparation of pulling back. The first valve 136 is activated to enable the second spray nozzle 142. Consequently, lubricant will be transferred only to the second spray nozzle 142. One skilled in the art will appreciate that, alternatively, the second valve 144 may enable the first spray nozzle 140 so that the first spray nozzle 140 applies lubricant to the spindle pipe joint 28. One skilled in the art will appreciate that other configurations for the spray nozzles 140 and 142 are possible. For example, the present embodiment would be equally effective if the spray nozzles are positioned as shown in the embodiment depicted in FIGS. 17a and 17b and described subsequently. The timing of the application of lubricant to the pipe joints 30 will be described hereafter.

Figure 17A:
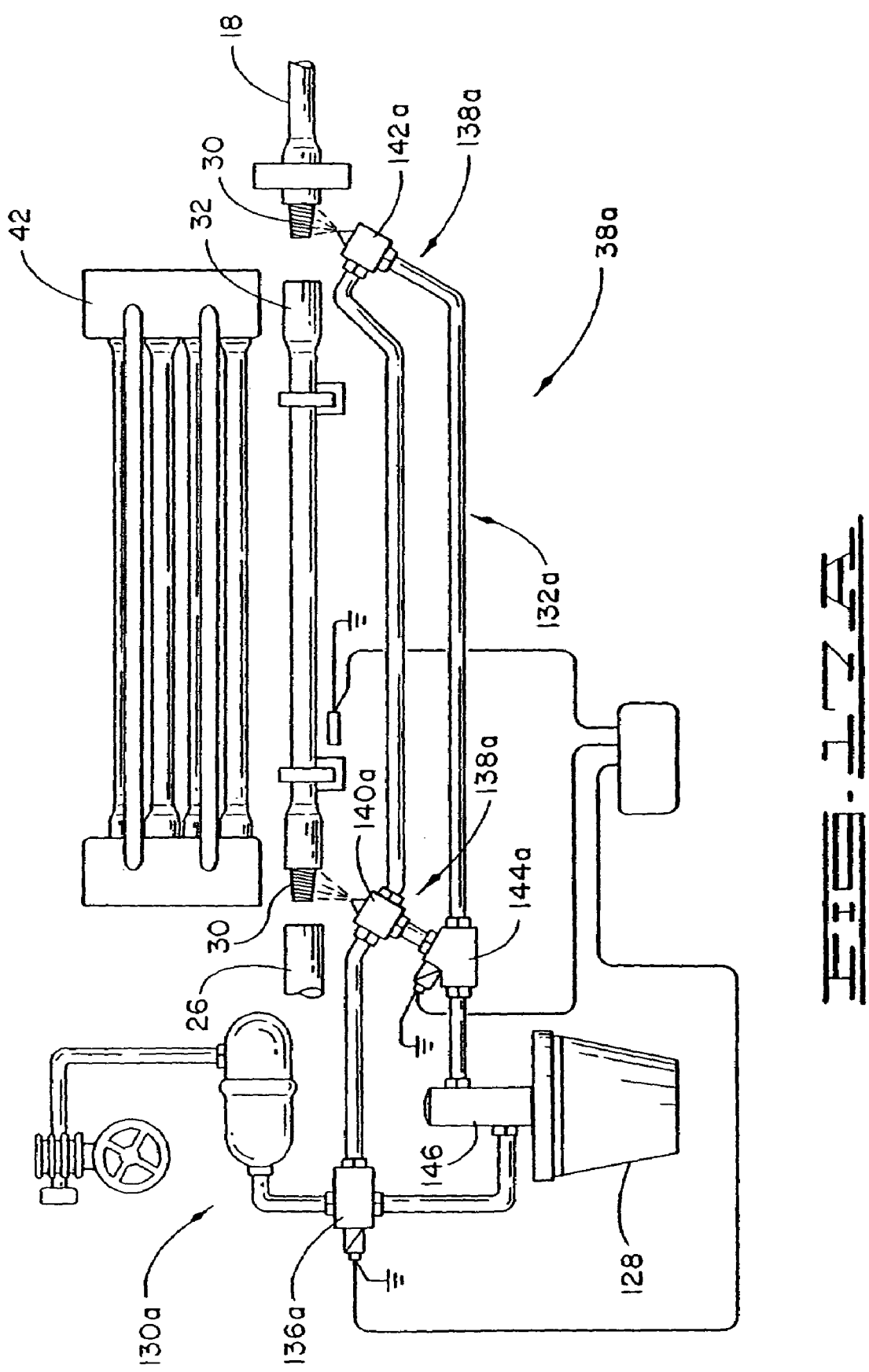
FIG. 17a is an exploded, schematic illustration of an alternative embodiment of a pipe lubrication assembly.

FIGS. 17a and 17b illustrate an alternative embodiment of the pipe lubrication assembly 38a. In this embodiment, the pump system 130a comprises a pneumatic pump 146. The pipe lubrication assembly 38a applies lubricant to the male threads of the pipe joints 30 as a pipe section 32 is transported to the spindle connection area 34. A first valve 136a supplies pressurized air to the pneumatic pump 146. The pneumatic pump 146 transfers lubricant to the applicator 132a. The applicator 132a comprises a nozzle assembly 138a that sprays atomized lubricant onto pipe joints 30. The lubricant is atomized by pressurized air that is supplied to the nozzle assembly 138a at the same time that the pneumatic pump 146 is activated.

During the boring operation, lubricant is applied to two pipe joints 30, at both ends of the pipe section 32 that is to be added to the drill string 18. Consequently, in this embodiment, the nozzle assembly 138a comprises a pair of spaced apart spray nozzles 140a and 142a. A first spray nozzle 140a is positioned to apply lubricant to the pipe section 32 being transferred to the spindle connection area 34 at the end proximate the spindle pipe joint 28. A second spray nozzle 142a is positioned to apply lubricant to the exposed pipe joint 30 of the drill string 18. The lubricant is applied after the spindle 26 disconnects from the drill string 18, prior to when a new pipe section 32 is moved into the spindle connection area 34.

During the backreaming operation, lubricant preferably is applied only to the exposed pipe joint 30 of the drill string 18 after the pipe section 32 is removed from the spindle connection area 34, since the spindle 26 will connect to the drill string in preparation of pulling back the drill string. A second valve 144a is activated to disable the first spray nozzle 140a. Consequently, lubricant will be transferred only to the second spray nozzle 142a. One skilled in the art will appreciate that other configurations for the spray nozzles 140a and 142a are possible. For example, the first spray nozzle 140a could be configured to apply lubricant to the spindle pipe joint 28.

Figure 18:
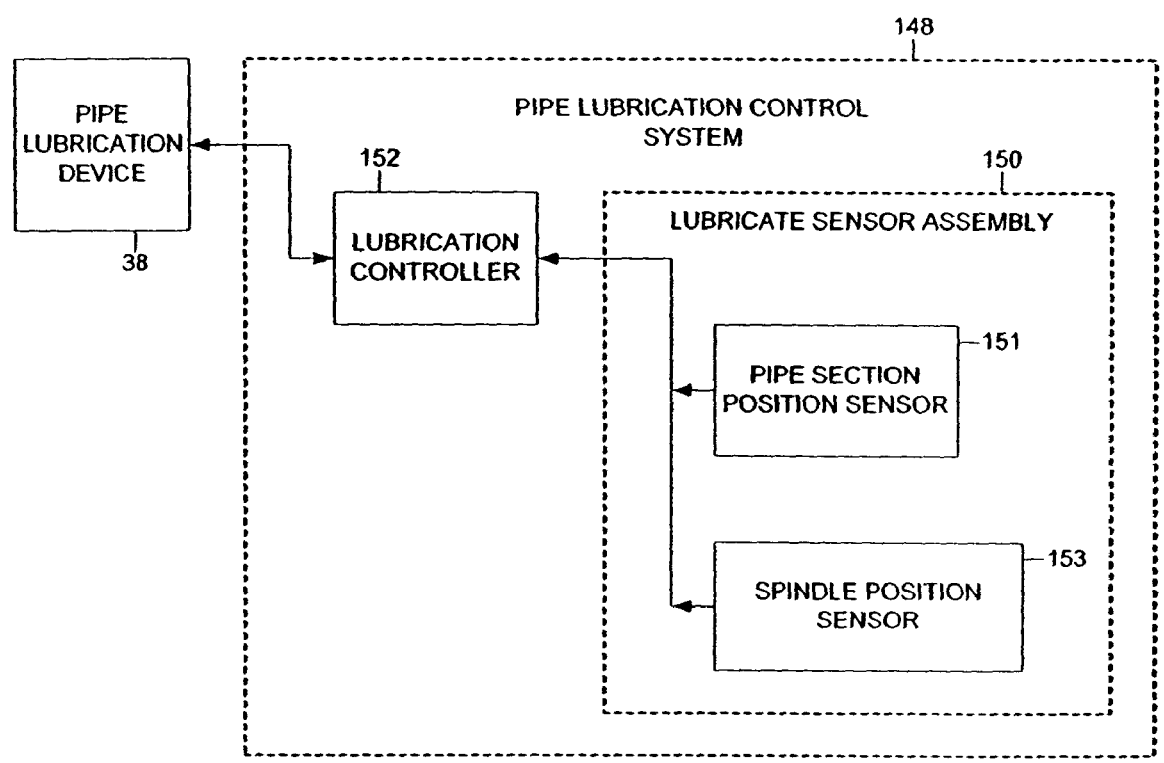
FIG. 18 is a block diagram of a circuit for controlling the pipe lubrication assembly.

The present invention also provides for the automated control of the pipe lubrication assembly 38 or 38a, using a pipe lubrication control system. Illustrated in FIG. 18, the pipe lubrication control system 148 comprises a lubricate sensor assembly 150 and a lubrication controller 152. The lubricate sensor assembly 150 determines the relative position of a pipe section 32 being transferred to the spindle connection area 34 and the spindle 26 in the spindle connection area. The lubricate sensor assembly 150 comprises a pipe section position sensor 151 and a spindle position sensor 153.

During the boring operation, when a pipe section 32 is added to the drill string 18, the pipe section position sensor 151 transmits a LUBRICATE PIPE signal to the lubrication controller 152, indicating that the pipe section is in a position to be lubricated. The pipe lubrication assembly 38 or 38a of the present invention preferably is used in conjunction with the pipe handling assembly 36. The pipe section position sensor 151 detects the position of the transport assembly 50 by correlating the operation of the drive assembly 52 to the distance traveled by the transport assembly. When the pipe section position sensor 151 detects the pipe section 32 to be added to the drill string 18 is in a position to be lubricated, the pipe section position sensor transmits the LUBRICATE PIPE signal. One skilled in the art will appreciate that the pipe section position sensor 151 may be replaced by any device suitable for indicating when the pipe section 32 is positioned so that lubricant can be applied to the pipe joints 30.

The spindle position sensor 153 is used by the lubrication controller 152 to detect when lubricant is to be dispensed during the backreaming operation. The spindle position sensor 153 detects the position of the spindle 26 by monitoring the motor used to thrust the drill string 18 and correlating revolutions of the motor to the distance the spindle travels. During the backreaming operation, when the spindle position sensor 153 detects the spindle 26 in the spindle connection area 34 proximate the exposed end of the drill string 18, the spindle position sensor 153 transmits a spindle position signal to the lubrication controller 152. In response to the signals from the lubricate sensor assembly 150, the lubrication controller 152 activates the pipe lubrication assembly 38 or 38a so that the pipe joints 30 are lubricated.

Figure 19:
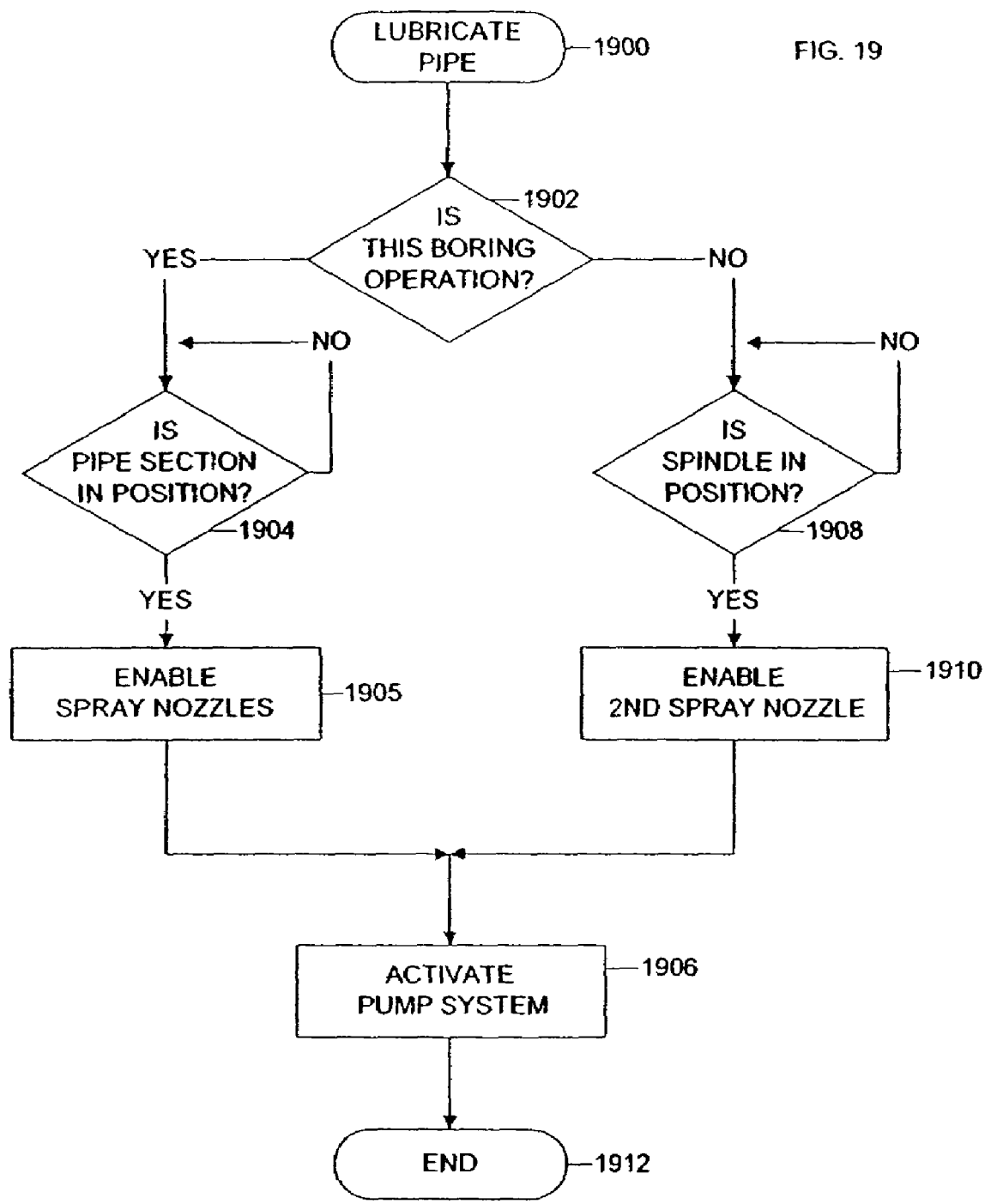
FIG. 19 is a flow diagram of a version of software for the lubrication controller of FIG. 18.

An example of logic followed by the lubrication controller 152 is illustrated in FIG. 19. The lubrication controller first determines at 1902 if lubricant is being applied during the boring operation or the backreaming operation. During the boring operation, when a pipe section 32 is added to the drill string 18, the lubrication controller 152 waits at 1904 for the pipe section to be put in position so that the pipe joints 30 can be lubricated. When the LUBRICATE PIPE signal is received indicating the pipe section 32 is in position, the first spray nozzle 140 or 140a and the second spray nozzle 142 or 142a are enabled at 1905. The pump system 130 or 130a is then activated at 1906 and lubricant is delivered to the first spray nozzle 140 or 140a and the second spray nozzle 142 or 142a.

During the backreaming operation, when a pipe section 32 is removed from the drill string 18, the lubrication controller 152 waits at 1908 for the SPINDLE POSITION signal. The SPINDLE POSITION signal is transmitted by the spindle position sensor 153 when the spindle 26 is in position for lubricant to be dispensed prior to the spindle reconnecting to the drill string 18. When the SPINDLE POSITION signal is received, the first valve 136 or 136a is used to enable the second spray nozzle 142 or 142a at 1910. The lubrication controller 152 then activates the pump system 130 or 130a at 1906, and only the second spray nozzle 142 or 142a dispenses lubricant. The LUBRICATE routine completes at 1912.

A third embodiment for the pipe lubrication assembly is shown in FIGS. 20 and 21. As shown, the pipe lubrication assembly 38b is a passive mechanical apparatus. The pump system 130b comprises a rotatable shaft 154 coupled to a piston 156 that pumps lubricant out of the lubricant reservoir 128b. The shaft 154 is rotated by a movable arm 158 having a first end that is connected to the shaft and a second end that comes in physical contact with the pipe section 32 to be lubricated. The movable arm 158 is positioned such that, as the pipe section 32 is transported to the spindle connection area 34 in the direction of the arrow A (FIG. 21), the pipe section will contact the second end of the movable arm, causing the movable arm to pivot. As the movable arm 158 pivots, the shaft 154 rotates in the direction of arrow B (FIG. 21). The rotation of the shaft 154 causes the piston 156 to compress and pump lubricant out of the lubricant reservoir 128b. The lubricant is transferred through a hose assembly 160 to the applicator 132b. The applicator 132b is positioned so that as the pipe joint 30 to be lubricated passes by the applicator, the pipe joint will brush against the applicator so that lubricant is wiped onto the pipe joint. In the embodiment shown, the applicator 132b is part of the movable arm 158.

During the backreaming operation, when pipe sections 32 are transported from the spindle connection area 34, the pipe lubrication assembly 38b is designed not to dispense lubricant. As the pipe section 32 is transported in the direction opposite arrow A, the pipe section contacts and pivots the movable arm 158. As the movable arm 158 pivots, the shaft 154 rotates in the direction opposite arrow B. The rotation of the shaft 154 in this direction causes the piston 156 to be withdrawn and not pump lubricant. A torsion spring 162 on the shaft 154 returns the shaft to its original position, regardless of the direction of the shaft rotation.

Automatic Control of Pipe Handling System

The present invention preferably provides for automatic control of the pipe handling system 17 to minimize the need for operator involvement. A machine control system, shown in FIG. 22, synchronizes the operations of the pipe handling assembly 36, the pipe lubrication assembly 38, and the makeup/breakout assembly 40a. The machine control system 170 is activated by the operator and controls the operation of the boring machine 10 when a pipe section 32 is added to, or removed from, the drill string 18. The machine control system 170 comprises a machine controller 172 that controls the operations of the boring machine 10.

FIGS. 23 through 31 illustrate flow charts of exemplary embodiments of logic used by the machine controller 172. One skilled in the art will appreciate that the machine controller 172 can be programmed to control any number of the assemblies to allow the operator as much control as desired. For example, control of the pipe lubrication assembly 38 can be omitted where drill pipe that does not require lubrication is used. Alternatively, the pipe lubrication assembly 38 can be omitted so that the operator can lubricate pipe joints 30 manually as needed, or so that a passive mechanical assembly, such as that shown in FIGS. 20 and 21 and described earlier, could be used.

Figure 23:
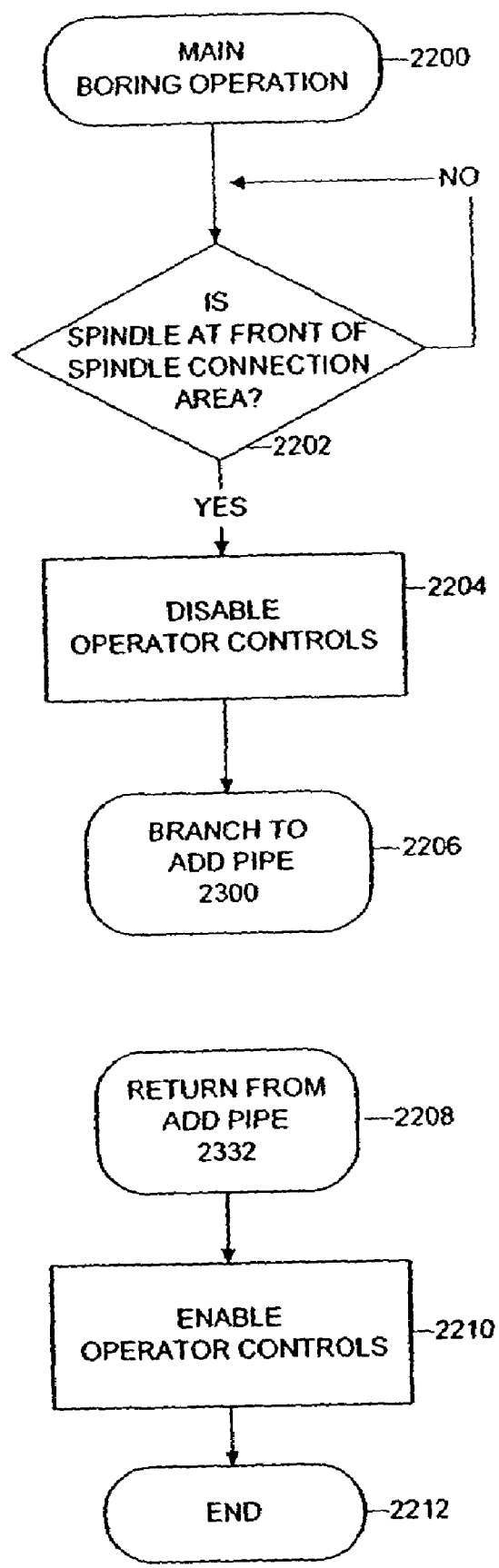

FIG. 23 illustrates a main boring operation logic diagram. When a pipe section 32 must be added to the drill string 18 during the boring operation, the operator activates the machine control system 170 by turning a switch or pushing a button at the control panel 24 (see FIG. 1) at 2200. The machine controller 172 waits at 2202 for the SPINDLE POSITION signal indicating that the spindle 26 is positioned at the front of the spindle connection area 34. When the SPINDLE POSITION signal is received, the machine controller 172 disables the operator's controls at 2204. The operation then branches to the ADD PIPE routine at 2206, illustrated in FIG. 24. When the pipe section 32 has been added to the drill string 18, control returns at 2208, and the operator's controls are enabled at 2210. The operator can then resume the boring operation at 2212.

Figure 25:
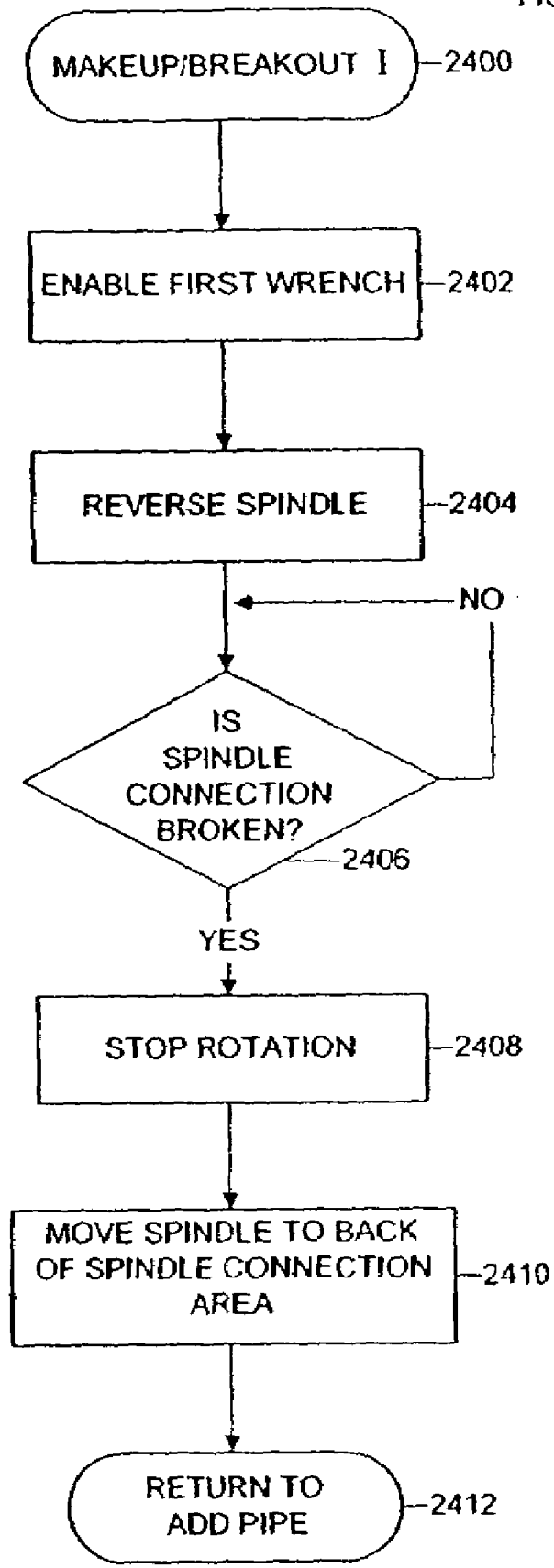
Figure 26:
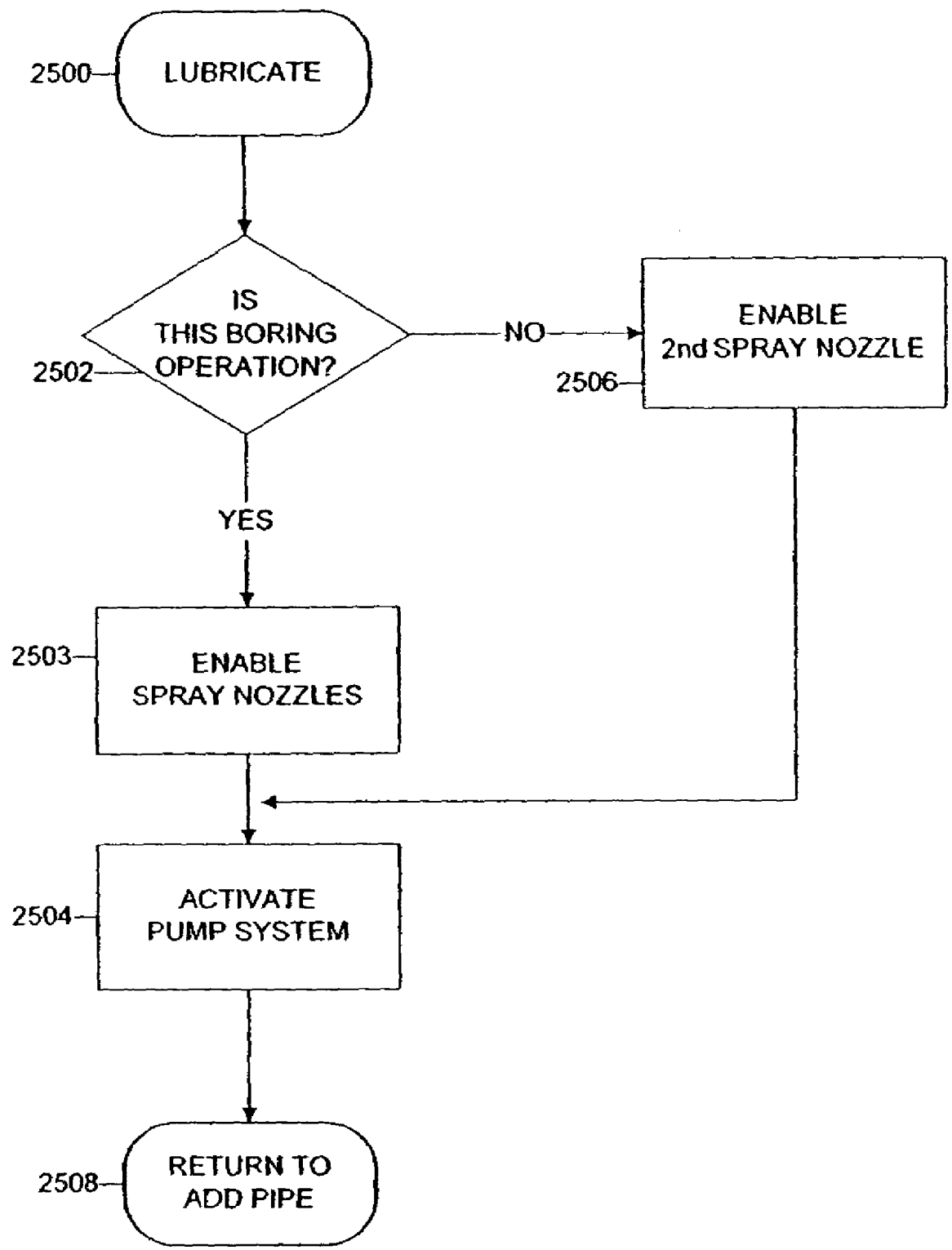

FIG. 24 illustrates logic flow for adding a pipe section 32 to the drill string 18. At 2302 the active gripper device 58a, if used, is relaxed. The return arms 49 are lowered at 2304 to place a pipe section 32 in the pipe holding member 56. The gripper device 58a is then closed at 2306 to secure the pipe section in the pipe holding member 56. The MAKEUP/BREAKOUT I routine of FIG. 25 is then initiated at 2308 to disconnect the spindle 26 from the drill string 18. When control returns at 2310, the spindle 26 is positioned at the back end 33 of the spindle connection area 34. The shuttle arms 55 are extended to the lubrication point at 2312 where the LUBRICATE routine of FIG. 26 is called at 2314. One skilled in the art will appreciate that an apparatus such as the lubrication sensor assembly 150, described earlier, can be used to indicate the position of the pipe section 32 to be lubricated.

Figure 27:
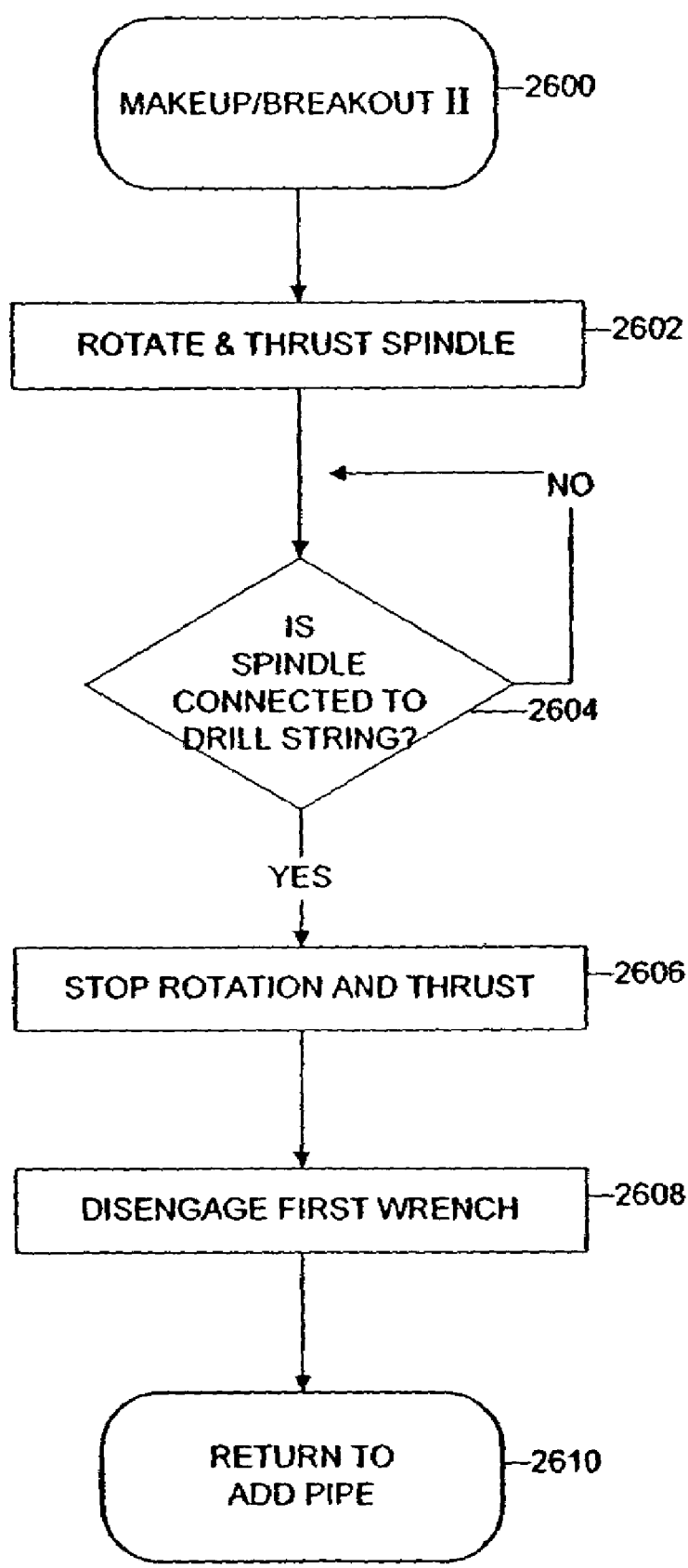

After the pipe section 32 has been lubricated, the shuttle arms 55 are extended to the spindle connection area 34 at 2318. The gripper device 58a is relaxed at 2320 and the MAKEUP/BREAKOUT II routine of FIG. 27 is called at 2322 to make up the connection between the spindle 26 and the pipe section 32 in the spindle connection area 34 and between the pipe section and the drill string 18. When control returns at 2324, the gripper device 58a is opened at 2326. At 2328 the return arms 49 are lifted, and at 2330 the shuttle arms 55 are retracted to the magazine 42. Control returns to the MAIN BORING procedure of FIG. 23 at 2332.

The MAKEUP/BREAKOUT I routine of FIG. 25 illustrates how the spindle 26 is disconnected from the drill string 18 during the boring operation before a pipe section 32 is placed in the spindle connection area 34. The first wrench 114 of the makeup/breakout assembly 40a is engaged at 2402 to secure the drill string 18. The spindle 26 is then rotated in reverse at 2404 to break the spindle connection to the drill string 18. The routine then waits at 2406 for a signal indicating that the spindle 26 is disconnected from the drill string 18. An apparatus such as the connection sensor assembly 110 described above could be used to detect when the spindle connection is broken.

When the spindle 26 has been disconnected from the drill string 18, the rotation of the spindle is stopped at 2408. The spindle 26, now free from the pipe section 32, is then moved to the back end 33 of the spindle connection area 34 at 2410. Control returns back to the ADD PIPE routine of FIG. 24 at 2412. The present discussion illustrates automatic control of the makeup/breakout assembly 40a of FIG. 14. Other makeup/breakout assemblies, such as the makeup/breakout assembly 40 shown in FIG. 10 and described earlier, could be automatically controlled by the machine controller 172.

A LUBRICATE routine is shown in FIG. 26. A first check is made at 2502 to determine if a pipe section 32 is being added during the boring operation or being removed during the backreaming operation. As discussed earlier, during the backreaming operation only one pipe joint 30 need be lubricated. Thus, during the boring operation the first spray nozzle 140a and the second spray nozzle 142a are enabled at 2503. The pump system 130 is then activated at 2504, and pipe joints 30 are lubricated at both ends of the pipe section 32 being added to the drill string 18. During the backreaming operation, the second spray nozzle 142a is enabled at 2506. When the pump system 130 is activated at 2504, only the second spray nozzle 142a applies lubricant to the pipe joint 30 on the exposed end of the drill string 18. Control is returned to the calling procedure at 2508.

FIG. 27 illustrates logic of a MAKEUP/BREAKOUT II routine that connects the spindle 26 to the pipe section 32 in the spindle connection area 34 and the pipe section to the drill string 18. At 2602 the spindle 26 is rotated and thrust forward to connect to the pipe section 32 and to subsequently connect the pipe section to the drill string 18. The routine then waits at 2604 for a signal indicating the spindle 26 is connected to the drill string 18. When the connections are made, the rotation and thrust of the spindle are stopped at 2606. The first wrench 114 is then disengaged at 2608 so that the drill string 18 can rotate freely and the boring operation can continue at 2610.

Figure 28:
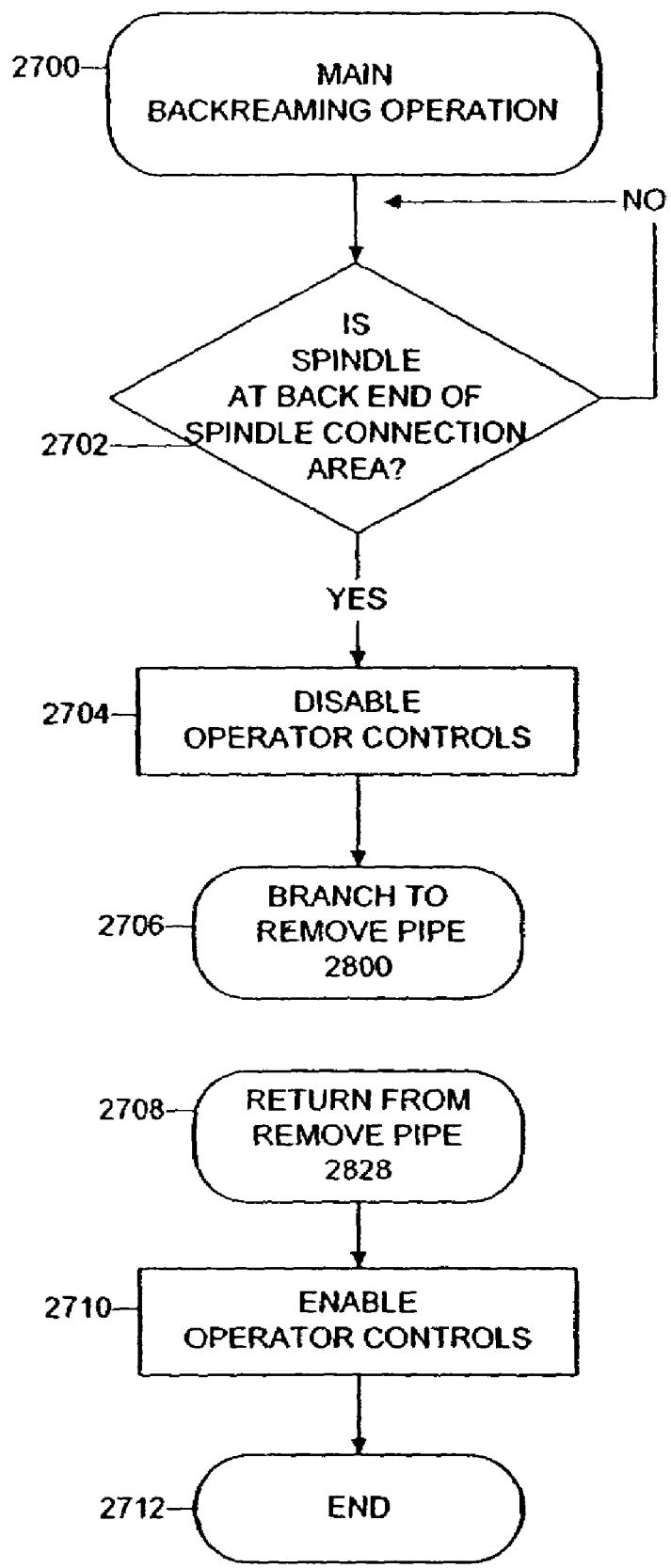
FIGS. 28–31 illustrate flow diagrams of software for the machine control system of FIG. 22 during a backreaming operation.

FIG. 28 illustrates a main backreaming operation logic diagram. When a pipe section 32 is to be removed from the drill string 18 during the backreaming operation, the operator activates the machine control system 170 by turning a switch or pushing a button on the control panel 24 (see FIG. 1) at 2700. The machine controller 172 waits for the spindle 26 to be positioned at the back end 33 of the spindle connection area 34 at 2702. When the spindle 26 is in position, the machine controller 172 disables the operator's controls at 2704. The operation then branches to the REMOVE PIPE routine at 2706, illustrated in FIG. 29. When the pipe section 32 has been removed from the drill string 18, control returns at 2708 and the operator's controls are enabled at 2710. The operator then can resume the backreaming operation at 2712.

Figure 29:
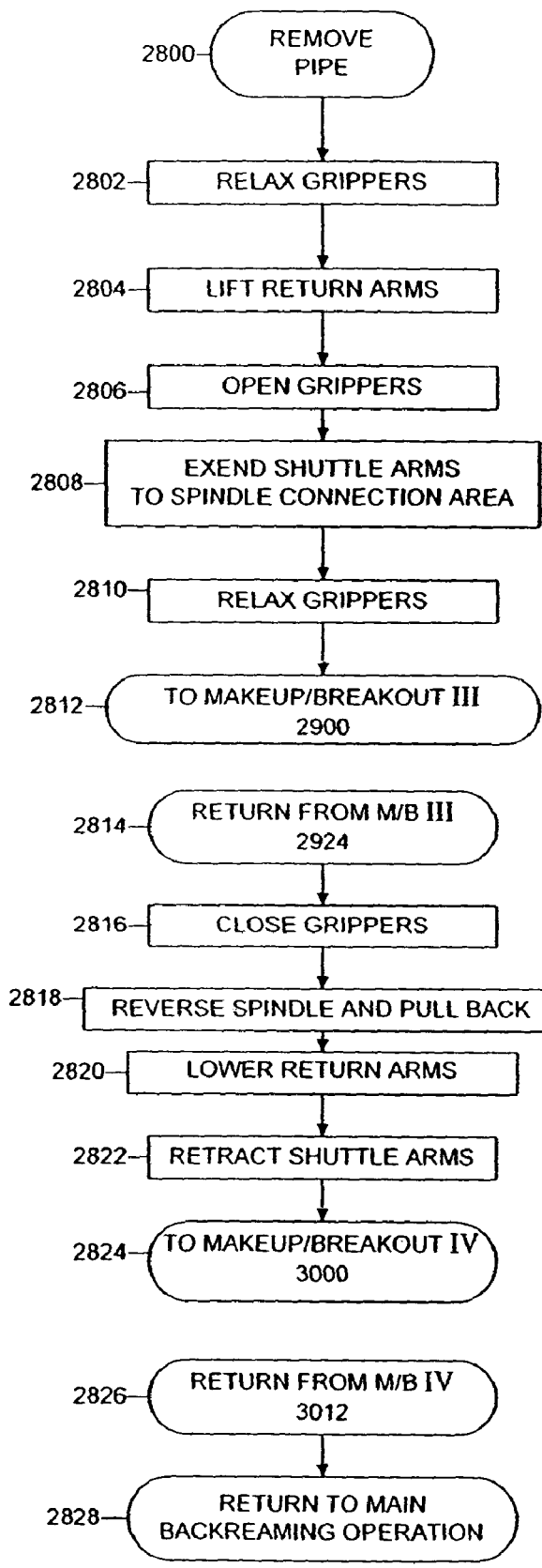

FIG. 29 illustrates the logic flow for removing a pipe section 32 from the drill string 18. At 2802 the active gripper device 58a is opened to the relaxed position. The return arms 49 are lifted at 2804 to free the shuttle arms 55 from the pipe sections 32 in the magazine 42. The gripper device 58a is then opened at 2806 and the shuttle arms 55 are extended to the spindle connection area 34 at 2808. The gripper device 58a is then closed to the relaxed position at 2810 to support the pipe section 32 in the spindle connection area 34. The makeup/breakout iii routine of FIG. 30 is initiated at 2812 to disconnect the spindle 26 from the drill string 18.

Figure 31:
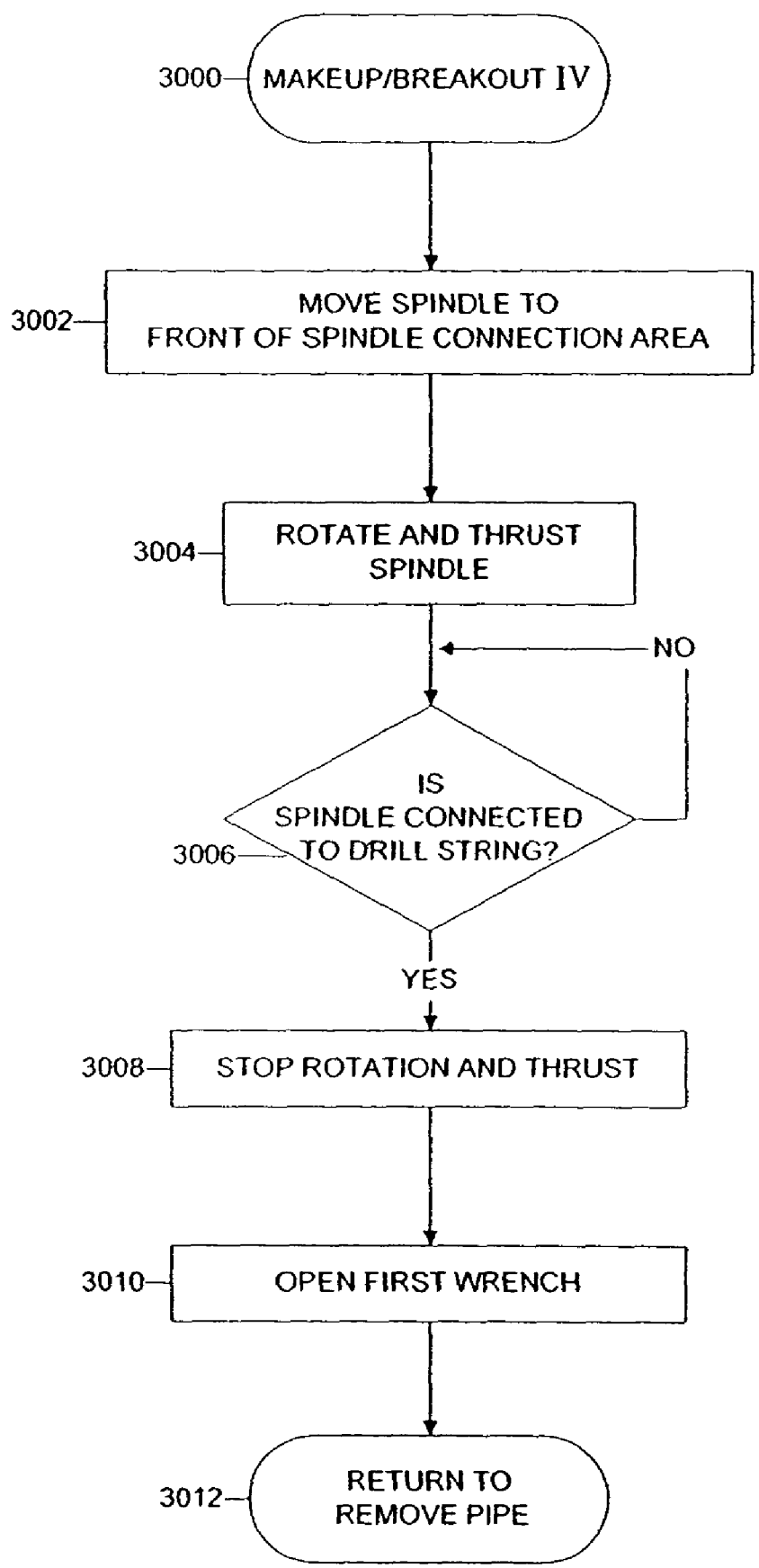

When control returns at 2814, the pipe section 32 in the spindle connection area 34 is free from the spindle 26 and the drill string 18. The gripper device 58a is closed at 2816 to secure the pipe section 32 in the pipe holding member 56. At 2818 the spindle 26 is rotated in reverse and pulled back from the pipe section 32 in the spindle connection area 34. One skilled in the art will appreciate that the pipe section 32 is now free from the drill string 18 and the spindle 26. The return arms 49 are lowered at 2820 and the shuttle arms 55 are then retracted to their position beneath the magazine 42 at 2822. The makeup/breakout iv routine of FIG. 31 is called at 2824 to reconnect the spindle 26 to the drill string 18. When control returns at 2826, the boring machine 10 is ready to resume backreaming, and control is returned to the main backreaming procedure of FIG. 28 at 2828.

Figure 30:
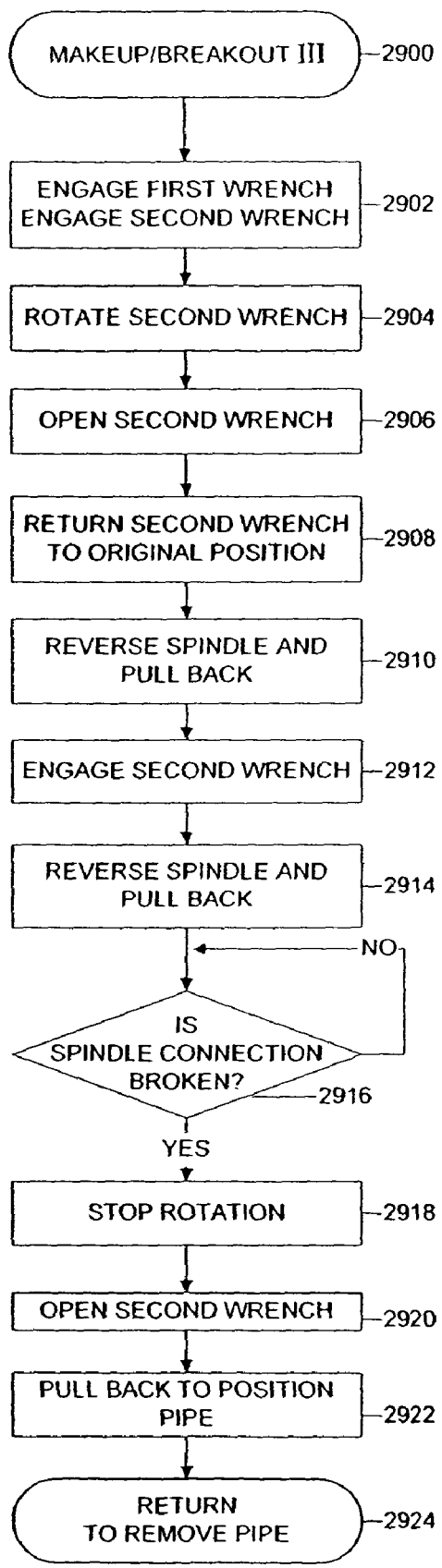

The MAKEUP/BREAKOUT III routine of FIG. 30 illustrates how the pipe section 32 in the spindle connection area 34 is disconnected from the drill string 18 during the backreaming operation. The first wrench 114 and the second wrench 116 of the makeup/breakout assembly 40a are engaged at 2902 to secure the pipe section 32 in the spindle connection area 34 and the drill string 18. At 2904 the second wrench 116 is rotated to disconnect the pipe section 32 from the drill string 18. The second wrench 116 is then opened at 2906 and rotated back to its original position at 2908. At 2910 the spindle 26 and the pipe section 32 are rotated in reverse and pulled back to position the pipe section so that it is free from the drill string 18, but in position for the second wrench 116 to secure the pipe section. The second wrench 116 is then engaged at 2912 to again secure the pipe section 32 in the spindle connection area 34.

The spindle 26 is rotated in reverse at 2914 to break but not unscrew the spindle connection to the pipe section 32. The routine waits at 2916 for the spindle 26 connection to the pipe section 32 to be broken. When the spindle 26 is broken loose from the pipe section 32, the rotation and pullback of the spindle are stopped at 2918. The second wrench 116 is then opened at 2920 and the pipe section is pulled back to align it with the magazine 42 at 2922. One skilled in the art will appreciate that a pipe section 32 in the spindle connection area 34 is now free from the spindle 26 and the drill string 18. Control then returns back to the REMOVE PIPE routine of FIG. 29 at 2924.

FIG. 31 illustrates the logic of a MAKEUP/BREAKOUT IV routine where the spindle 26 is reconnected to the drill string 18. At 3002 the spindle 26 is moved to the front end of the spindle connection area 34. The spindle 26 is rotated and thrust forward to connect to the drill string 18 at 3004. The routine then waits at 3006 for the spindle 26 to be reconnected to the drill string 18. When the connection to the drill string 18 is made, the rotation and thrust of the spindle 26 are stopped at 3008. The first wrench 114 is then opened at 3010 so that the drill string 18 can rotate freely and the backreaming operation can continue at 3012.

Those skilled in the art will appreciate that variations from the specific embodiments disclosed above are contemplated by the invention. For example, the description of the machine control system 170 incorporates an active gripper device 58a as shown in FIG. 5, the wrench devices of the makeup/breakout assembly 40a illustrated in FIG. 14, and the nozzle assembly 138a shown in FIG. 17a. However, the use of other assemblies is contemplated. For example, a passive gripper device such as that shown in FIG. 4 could be used so that the machine control system 170 need not operate the gripper device. Similarly, the makeup/breakout assembly 40 of FIG. 10 could be substituted and its operation controlled by the machine control system 170. Where any modification or substitution is contemplated, the logic for the machine controller 172 would have to modified to control the particular assemblies that comprise the pipe handling system.

As described herein, the machine controller 172 of the machine control system 170 is preferably microprocessor based and capable of executing the logic described above to operate the assemblies included in the pipe handling system 17. However, both microprocessor based and non-microprocessor based systems may be used for controlling the operations of the pipe handling system 17. For example, the machine control system 170 may comprise a plurality of switches, valves, relays, solenoids, and other electronic or mechanical devices to control and sequence the operations of any of the assemblies of the pipe handling system 17.

By way of example, FIG. 32 illustrates an exemplary embodiment of a circuit for controlling the first wrench 80 and the collar wrench 102 of the makeup/breakout assembly 40 of FIG. 10. The circuit of FIG. 32 can be used to control the operations of the wrenches during both the boring operation and the backreaming operation, depending on the state of a main control switch. Additionally, the system of FIG. 32 can be used to open and close the front wrench 80, engage and disengage the collar wrench 102, and otherwise control the sequences necessary to operate the makeup/breakout assembly 40. As shown, the circuit of FIG. 32 operates in conjunction with the above described systems to control other assemblies and in conjunction with systems for controlling other aspects of the boring machine 10, such as the thrust and rotation of the spindle 26.

FIG. 33 illustrates an additional example of a non-microprocessor based machine control system 170 for the pipe handling system 17. The circuit of FIG. 33 shows an exemplary embodiment of a circuit for controlling the pipe handling assembly 36 of FIGS. 3 and 4. The circuit of FIG. 33 can be used to control the operations of the pipe handling assembly 36 during both the boring operation and the backreaming operation, depending on the state of a main control switch. Additionally, the system of FIG. 33 can be used to extend and retract the shuttle arms 55, raise and lift the return arms 49, and otherwise control the sequences necessary to operate the pipe handling assembly 36. As shown, the circuit of FIG. 33 operates in conjunction with the above described systems to control other assemblies and in conjunction with systems for controlling other aspects of the boring machine 10, such as the thrust and rotation of the spindle 26.

Although the present invention has been described with respect to several specific preferred embodiments, various changes, modifications, and substitutions of parts and elements may be suggested to one skilled in the art. Consequently, the invention should not be restricted to the above embodiments and it is intended that the present invention encompass such changes, modifications, and substitutions of parts and elements without departing from the spirit and scope of the invention.

What is claimed is:

1. A makeup/breakout system for use with a horizontal boring machine having a drive system, a drill string comprised of pipe sections connectable at threaded pipe joints, and a spindle for connecting the drill string to the drive system, the drive system being comprised of a drive frame, a rotation drive mounted to the drive frame, and a rotation shaft driven by the rotation drive and characterized by an amount of axial float, the makeup/breakout system comprising:

a biasing member positioned to urge the rotation shaft to a center float position;

a float sensor adapted to determine the amount of float in the rotation shaft and to transmit a float signal; and a connection controller adapted to receive the float signal and to coordinate thrust and rotation in response to the float signal.

2. The system claim 1 wherein the float sensor comprises:

a sensor rod attached to the drive frame; and a magnet coupled to the rotation shaft and adapted to move along the sensor rod;

wherein the float signal is representative of a position of the magnet on the sensing rod.

3. The system of claim 2 wherein the connection controller is further adapted to send a signal to the drive system to stop thrust if the float signal indicates the float has reached a front limit and the drive system is pulling back or if the float signal indicates the float has reached a rear limit and the drive system is pushing forward.

4. The system of claim 2 wherein the connection controller is further adapted to send a signal to the drive system to stop rotation if the float signal indicates the float has reached a front limit and the spindle is rotating clockwise or if the float signal indicates the float has reached a rear limit and the spindle is rotating counterclockwise.

5. The system of claim 1 wherein the float sensor comprises:
   a sensor rod attached to the rotation shaft; and
   a magnet coupled to the drive frame and adapted to move along the sensor rod;
      wherein the float signal is representative of a position of the magnet on the sensing rod.

6. The system of claim 1 wherein the biasing member comprises a first spring positioned proximate at an aft end of the rotation drive and a second spring positioned proximate a fore end of the rotation drive.

7. The system of claim 1 wherein the connection controller is further adapted to send a signal to the drive system to limit thrust to a predetermined amount when the spindle is not rotating and is being moved toward or from the drill string.

8. The system of claim 7 wherein the thrust is limited to 60% of a maximum output.

9. The system of claim 1 wherein the connection controller is further adapted to send a signal to the drive system to adjust thrust to an amount calculated based upon the float signal indicative of the amount of float.

10. A makeup/breakout system for use with a horizontal boring machine having a drive system, a drill string comprised of pipe sections connectable at threaded pipe joints, and a spindle for connecting the drill string to the drive system, the drive system being comprised of a drive frame, a rotation drive mounted to the drive frame, and a rotation shaft driven by the rotation drive and characterized by an amount of axial float, the makeup/breakout system comprising:
   a biasing member positioned to urge the rotation shaft to a center float position;
   a float sensor adapted to determine the amount of float in the rotation shaft and to transmit a float signal; and
   a connection controller adapted to receive the float signal and to coordinate thrust and rotation in response to the float signal;
   wherein the connection controller is further adapted to calculate a thrust output based on a rotation output.

11. The system of claim 10 wherein the connection controller is further adapted to send a signal to the drive system to adjust thrust to an amount calculated based upon the float signal indicative of the amount of float.

12. The system claim 10 wherein the float sensor comprises:
   a sensor rod attached to the drive frame; and
   a magnet coupled to the rotation shaft and adapted to move along the sensor rod;
      wherein the float signal is representative of a position of the magnet on the sensing rod.

13. The system of claim 10 wherein the float sensor comprises:
   a sensor rod attached to the rotation shaft; and
   a magnet coupled to the drive frame and adapted to move along the sensor rod;
      wherein the float signal is representative of a position of the magnet on the sensing rod.

14. The system of claim 10 wherein the biasing member comprises a first spring positioned proximate at an aft end of the rotation drive and a second spring positioned proximate a fore end of the rotation drive.

15. The system of claim 10 wherein the connection controller is further adapted to send a signal to the drive system to adjust thrust to an amount calculated based upon the float signal indicative of the amount of float.

16. The system of claim 10 wherein the connection controller is further adapted to send a signal to the drive system to stop thrust if the float signal indicates the float has reached a front limit and the drive system is pulling back or if the float signal indicates the float has reached a rear limit and the drive system is pushing forward.

17. The system of claim 10 wherein the connection controller is further adapted to send a signal to the drive system to stop rotation if the float signal indicates the float has reached a front limit and the spindle is rotating clockwise or if the float signal indicates the float has reached a rear limit and the spindle is rotating counterclockwise.

* * * * *